US009596191B2

(12) United States Patent
Nagumo et al.

(10) Patent No.: US 9,596,191 B2
(45) Date of Patent: Mar. 14, 2017

(54) NETWORK RELAY SYSTEM AND NETWORK RELAY DEVICE

(75) Inventors: Takashi Nagumo, Kawasaki (JP); Masashi Uchiya, Kawasaki (JP); Teruo Kaganoi, Kawasaki (JP); Mitsuo Yamamoto, Kawasaki (JP); Nobuhito Matsuyama, Kawasaki (JP)

(73) Assignee: Alaxala Networks Corporation, Kanagawa (JP)

( * ) Notice: Subject to any disclaimer, the term of this patent is extended or adjusted under 35 U.S.C. 154(b) by 425 days.

(21) Appl. No.: 13/991,281

(22) PCT Filed: Jan. 19, 2012

(86) PCT No.: PCT/JP2012/051100
§ 371 (c)(1),
(2), (4) Date: Aug. 9, 2013

(87) PCT Pub. No.: WO2012/102170
PCT Pub. Date: Aug. 2, 2012

(65) Prior Publication Data
US 2013/0322458 A1 Dec. 5, 2013

(30) Foreign Application Priority Data

Jan. 25, 2011 (JP) ................................ 2011-012863
Jun. 17, 2011 (JP) ................................ 2011-135251

(51) Int. Cl.
*H04L 12/933* (2013.01)
*H04L 12/703* (2013.01)

(52) U.S. Cl.
CPC ............. *H04L 49/15* (2013.01); *H04L 45/28* (2013.01)

(58) Field of Classification Search
USPC ................................................ 370/351–401
See application file for complete search history.

(56) References Cited

U.S. PATENT DOCUMENTS 6,587,470 B1 * 7/2003 Bhadare ................. H04L 12/28
370/404
6,621,788 B1 9/2003 Terasaki
(Continued)

FOREIGN PATENT DOCUMENTS

CN 1842207 A 10/2006
JP 2000-156690 A 6/2000
(Continued)

OTHER PUBLICATIONS

International Preliminary Report on Patentability received in International Application No. PCT/JP2012/051100 dated Aug. 8, 2013.
(Continued)

*Primary Examiner* — Charles C Jiang
*Assistant Examiner* — Kyaw Z Soe
(74) *Attorney, Agent, or Firm* — Mattingly & Malur, PC

(57) ABSTRACT

A network relay system includes a plurality of communication devices. Each of the communication devices includes a data plane that transfers an input packet according to routing information, and a control plane having a processing unit that learns the routing information, and a control system repeater. The data planes of the respective communication devices can realize a non-blocking communication therebetween. Also, the control system repeater of an operational system receives the routing information from the processing unit, sets the routing information for the data plane of the subject communication device, and transmits the routing information to the control system repeater of the other communication device. The control system repeater of a standby system receives the routing information, and sets the routing information for the data plane of the subject communication device.

24 Claims, 23 Drawing Sheets

(56) References Cited

U.S. PATENT DOCUMENTS

| | | | | |
|---|---|---|---|---|
| 6,963,575 | B1* | 11/2005 | Sistanizadeh | H04L 12/4625 370/401 |
| 7,567,505 | B2 | 7/2009 | Iijima et al. | |
| 8,149,691 | B1* | 4/2012 | Chadalavada | H04L 45/00 370/219 |
| 2002/0176355 | A1* | 11/2002 | Mimms | H04L 45/02 370/216 |
| 2003/0137985 | A1 | 7/2003 | Koyanagi et al. | |
| 2005/0102384 | A1* | 5/2005 | Ueno | H04L 12/2803 709/223 |
| 2005/0117598 | A1* | 6/2005 | Iijima | H04L 45/586 370/412 |
| 2005/0135233 | A1* | 6/2005 | May | H04L 45/00 370/216 |
| 2007/0014231 | A1* | 1/2007 | Sivakumar | H04L 45/04 370/216 |
| 2007/0064704 | A1* | 3/2007 | Balay | H04L 45/00 370/392 |
| 2007/0162565 | A1* | 7/2007 | Hanselmann | G06F 8/67 709/219 |

FOREIGN PATENT DOCUMENTS

| | | |
|---|---|---|
| JP | 2003-218948 A | 7/2003 |
| JP | 2005-167435 A | 6/2005 |
| JP | 2008-502177 A | 1/2008 |
| WO | 2005/119977 A1 | 12/2005 |
| WO | 2006/103276 A1 | 10/2006 |

OTHER PUBLICATIONS

Virtual Switching System (VSS), [online], [search on May 5, 2011], Internet (URL:http://www.cisco.com/web/JP/news/cisco_news_letter/tech/vss/index.html).

Virtual Port Channel (vPC), [online], [search on May 5, 2011], Internet (URL:http://www.cisco.com/web/JP/product/hs/switches/nexus7000/prodlit/white_paper_c11-516396.html).

"Cisco CRS-1 carrier routing system multishelf system outline", http://www.cisco.com/japanese/warp/public/3/jp/service/manual_j/rt/crs/crsmcg/index.shtml.

Kato, Yoshinobu, "Koiki Ethernet Service VLAN Junansei ya Mo Shinraido ni Kufu Vendor Dokuji Gijutsu mo Kage de Katsuyaku", Nikkei Communications, No. 377, Nov. 4, 2002, pp. 88 to 97, 'Traffic Kanshi de Fukuso Kaihi'.

Tajima, Yoshitake et al., "A Service Control Framework in Distributed VPN Architecture", IEICE Technical Report, vol. 102, No. 352, Sep. 23, 2002, pp. 61 to 66 (CSNS2002-119, IN2002-63, CS2002-74).

Shimonishi, Hideyuki et al., "QoS Control Technique for Fair Services in High-speed Networks", 2001 Nen IEICE Communications Society Conference Taikai Koen Ronbunshu 2, Aug. 29, 2001, pp. 551 to 552 (SB-5-3).

Ichimaru, Satoshi, "Kigyo Network Kochikuho WAN wa 'Norikae' Zentei de Tsukuru Shin Service no Tojo ya Teikakakuka ni Sonaeyo", Nikkei System Integration, No. 122, May 26, 2003, pp. 174 to 189.

Takahashi, Tatsuo et al., "A Study of VPN Protocol over Mobile Communication Network and its Performance Evaluation", IPSJ SIG Notes, vol. 2002, No. 24, Mar. 8, 2002, pp. 67 to 74 (2002-MBL-20-10).

Chinese Office Action received in corresponding Chinese Application No. 201280003808.4 dated Nov. 13, 2015.

Virtual Switching System Q & A, Cisco, 2007, URL: www.cisco.com/web/JP/product/hs/switches/cat6500/prodlit/pdf/vss_qa.pdf Corresponding English URL: http://www.cisco.com/c/en/us/products/collateral/switches/catalyst-6500-virtual-switching-system-1440/prod_qas0900aecd806ed74b.html.

Okita, H. et al., "Highly Available Network Node with Redundant Routing Modules", The Institute of Electronics, Information and Communication Engineers, Jan. 22, 2004, pp. 43-46, vol. 103 No. 624.

* cited by examiner

| INPUT PORT NUMBER HD | OUTPUT PORT NUMBER |
|---|---|
| 1 | 5 |
| 2 | 6 |
| 3 | 7 |
| 4 | 8 |
| 5 | 1 |
| 6 | 2 |
| 7 | 3 |
| 8 | 4 |

NETWORK RELAY SYSTEM AND NETWORK RELAY DEVICE

TECHNICAL FIELD

The present invention relates to a network relay system and a network relay device, particularly to a virtualization and redundancy technique of a router and a switch which conduct packet exchange in a computer network using an internet protocol (IP) and an Ethernet (registered trademark), and more particularly to a network relay system and a network relay device employing the virtualization and redundancy technique of a control plane (control system).

Also, the present invention relates to a technique for enabling the virtualization and redundancy of the network relay device.

BACKGROUND ART

As a conventional device redundancy technique in the computer network, for example, as disclosed in Non Patent Literature 1 (VSS: virtual switching system) and Non Patent Literature 2 (vPC: virtual port channel), there has been known a system in which a dedicated line for allowing a data plane traffic and a control plane traffic crossing between devices to pass therethrough is prepared, and traffic is crossing between the control planes on the basis of a protocol to virtually realize device redundancy. Both techniques of Non Patent Literature 1 and Non Patent Literature 2 are to perform a link-aggregation (LA) between two devices to realize the device redundancy. A difference between the respective literatures resides in that the number of control planes (viewed from the network) appears to be one (Non Patent Literature 1) or two (Non Patent Literature 2).

With progress of an information and communication technology (ICT), a router having a high processing performance has been demanded. As one method for providing the router having the high processing performance, there is virtualization of the router. The virtualization of the router means that a plurality of routers are bundled together, and functions as one virtual router. The virtualized router has not only the high processing performance, but also can continue processing by the other routers except for a router that is in failure, for example, even if a part of routers (for example, one of three routers) is in failure, resulting in an advantage that the redundancy of the network system can be realized.

As an example of a method for realizing the virtualization of the router as described above, there has been known, for example, a method in which a plurality of routers are connected to each other through a device only for switching, and acts as one virtual router to provide the router having the high processing performance (for example, refer to Non Patent Literature 3). Also, as another example of the method for realizing the virtualization of the router, there has been known, for example, a method in which external ports (ports for connection to external terminals) of a plurality of routers are connected to each other, for example, with the use of a LAN cable, and act as one virtual router to provide the router having the high processing performance.

CITATION LIST

Non Patent Literature

[Non Patent Literature 1] Virtual Switching System (VSS), [online], [search on May 5, 2011], Internet (URL:http://www.cisco.com/web/JP/news/cisco_news_letter/tech/vss/index.html)

[Non Patent Literature 2] Virtual Port Channel (vPC), [online], [search on May 5, 2011], Internet (URL:http://www.cisco.com/web/JP/product/hs/switches/nexus7000/prodlit/whitepaperc11-516396.html)

[Non Patent Literature 3] "Cisco CRS-1 carrier routing system multishelf system outline", http://www.cisco.com/japanese/warp/public/3/jp/service/manual_j/rt/crs/crsmcg/index.shtml

SUMMARY OF INVENTION

Technical Problem

However, the method for connecting the plurality of routers to each other through the device only for switching suffers from such a problem that the costs are increased because the device only for switching is required, and the low costs cannot be realized. Also, the method of connecting the external ports of the plurality of routers to each other suffers from such a problem that the number of external ports of available routers is reduced, and a data transfer rate of the LAN cable that connects the ports to each other causes a bottleneck, as a result of which a non-blocking communication cannot be realized.

Also, the above problem is not limited to the routers, but common to the other overall network relay devices such as a layer 3 switch.

Subsequently, a single-chassis and a multi-chassis will be described as a redundant device with reference to the accompanying drawings. The respective drawings and the following description facilitate understanding of the problem to be solved by the present invention and an object of the present invention, and are not admitted prior art.

1) Single-Chassis (Hereinafter Also Called "SC")

FIG. 19 is an illustrative view of the single-chassis.

In general, a data plane of a chassis communication device has a back plane that installs a plurality of transfer engines, and transfers traffic between the transfer engines with "non-blocking".

A high reliability device 2000 using the SC is a technique (system) that divides a plurality of transfer engines into two having a transfer engine #1 and a transfer engine #2, and connects each floor switch to both of the transfer engine #1 and the transfer engine #2 to perform redundancy in a network fashion, thereby realizing high reliability. For example, the high reliability device 2000 connects the transfer engine and the floor switch to each other, for example, with the use of a technique called "link-aggregation".

(Advantages of SC)

Originally, because of a technique in which one device is divided into two to realize the high reliability in association with the floor switch, a specific mechanism is not required for the high reliability. Hence, the following advantages are obtained.

a) In setting a route from the control plane to the data plane, both of the transfer engine #1 and the transfer engine #2 may be set to the same value. That is, there is no setting difference of the transfer engines. Also, the control plane can set the route to the respective transfer engines in the same procedure.

b) In the CPU redundancy of the control plane, a conventional system control using the hardware is used. That is, a risk of a double-acting is low.

(Problem on SC)

On the other hand, the SC suffers from the following problem.

A) A failure of a single portion (for example, front power supply) causes the network system to be down.

B) The number of user ports has no scalability.

2) Multi-Chassis (Hereinafter Also Called "MC")

FIG. 20 is an illustrative view of the multi-chassis.

A high reliability device using the MC is a technique (system) in which for the purpose of solving the problem with the high reliability device 2000 using the SC, the data plane (together with the control plane) divides the device and conducts redundancy to realize the high reliability. The traffic crossing between the devices is transferred through a port 3100 in which a part of user ports is dedicated for redundancy. A bandwidth of the redundancy dedicated port 3100 is "blocking" which is about ⅒ of the back plane.

(Advantage of MC)

This technique aligns, for example, two chassis communication devices 3000 to configure the high reliability device. Hence, the following advantages are obtained to solve the problem with the SC.

c) Even if one communication device 3000 is down, the network system can continue to operate by the other communication device 3000.

d) The number of user ports is extended to about twice.

(Problem with MC)

On the other hand, the MC suffers from the following problems.

C) The routing of the traffic crossing between the communication devices 3000 needs to set a different value between the device #1 and the device #2 in the route setting from the control plane to the data plane because the bandwidth of the data plane crossing between the devices is "blocking". That is, the routing has a setting difference.

The routing will be described in more detail with reference to examples of FIGS. 19 and 20. As illustrated in FIG. 19, in the SC, the control plane (for example, CPU) sets routing learning contents (routing information) in which a destination is a terminal A, a next hop is a port 3 and a port 6 for the transfer engine #1 and the transfer engine #2. In this example, the port 3 and the port 6 can be set with the same costs. The transfer engine #1 outputs, for example, a packet addressed to the terminal A, which is received from a terminal B, to the port 3 or the port 6 according to set routing information (routes indicated by circled numbers 1 and 2 in the figure). When the transfer engine #1 outputs the packet to the port 6, the packet passes through the non-blocking port and line crossing between the devices.

On the other hand, as illustrated in FIG. 20, in the MC, in the routing learning contents (routing information) in which the destination is the terminal A, and the next hop is the port 6 and a port 12, for example, the transfer engine #1 sets the port 6 of the next hop as a primary, and the transfer engine #2 sets the port 12 of the next hop as the primary. Thus, there is the setting difference. If the transfer engines #1 and #2 set the same routing learning contents by an equal cost, the packet is liable to pass through the redundancy dedicated port 3100 of the blocking, and exceeds a bandwidth of the redundancy dedicated port 3100 according to a traffic volume, and may generate a communication delay or a packet loss.

D) In the MC, the route setting from an operational system control plane to a remote side data plane is indirectly set through an inter-CPU communication with a standby control plane. For that reason, there arises a problem that the setting performance is lower than that of a local side data plane. For example, it takes more time than that of the local side data plane. Also, there arises a problem that a visibility is different between the local side data plane and the software. For example, the transfer engine of the local side data plane and a remote side control plane are visible from the operational system control plane, and the same interface is not used.

Thus, in addition to the above problem C), the route setting performance to the data plane is deteriorated, and the visibility of the data plane is different between the local side and the remote side in a software fashion.

E) In the CPU redundancy of the control plane, the conventional system control using the hardware is not used, and the system control using the software is required. As a result, a risk of the double-acting, and a risk that a high-speed switching of the system becomes difficult remain.

In the MC, the problems about the SC are solved, but the advantages of the SC are lost. Also, as described above, in the conventional multi-chassis/virtual-chassis technique, it is impossible to show the local side data plane and the remote side data plane in the same fashion when viewed from the control plane. For that reason, the realization of the device redundancy requires a communication between the respective control planes on the basis of a protocol. There is a tradeoff between the realization of the device redundancy, and the complication of control or the deterioration of the setting performance. Thus, the important problems remain in both of the SC/MC in the conventional high reliability device.

In view of the above circumstances, an object of the present invention is to provide a network relay device that can configure a virtual network relay device that can use all of the external ports and can realize a non-blocking communication without requiring an additional device.

Another object of the present invention is to realize the simplification of control and the prevention of a setting performance from being deterioration while showing a local side data plane and a remote side data plane in the same fashion when viewed from a control plane.

Solution to Problem

In the present invention, as means for solving the above problem, the transfer engines of the respective devices are nonblocked, and a new control system repeater is provided to solve the problem. The control system repeater is connected between the plurality of control planes to realize that all of the data planes are shown in the same fashion from the operational system control plane. As a result, there is no need to speak a protocol between the control planes, and the simplification of control and the prevention of a setting performance from being deterioration are realized.

According to the first solving means of the present invention, there is provided a network relay system including a plurality of communication devices, each of the communication devices comprising:

a transfer processing unit that transfers an input packet according to routing information; and a control unit having a processing unit that learns the routing information and a control system repeater, which is set in an operational system or a standby system, wherein the respective transfer processing units of the plurality of communication devices can realize a non-blocking communication with each other, the control system repeater of the control unit in the operational system receives the routing information from the processing unit, sets the routing information for the transfer processing unit of the subject communication device, and transmits the routing information to the control system repeater of another communication device, and the control system repeater of the control unit in the standby system receives the routing information from the control system repeater of another communication device, and sets the routing information for the transfer processing unit of the subject communication device.

With the above configuration, the local side and remote side transfer processing units (data planes) can be shown in the same fashion when viewed from the control unit (control plane), and the simplification of control and the prevention of the setting performance from being deterioration can be realized. Also, because there is no need to concern about the number of devices in the remote side data plane when viewed from the operational system control plane, the effect of extending the scalability is provided.

In the above network relay system,
the transfer processing unit may include:
a connection unit including an external interface which is a connection interface with an external; and
a transfer unit that transfers a received packet received through the connection unit, and
the respective transfer processing units of the plurality of communication devices are connected by an external signal line having a total bandwidth which is equal to or larger than a total of bandwidths of lines in the connection unit of a predetermined communication device to make the non-blocking communication with each other realizable.

With the above configuration, the non-blocking communication between the respective transfer processing units of the plurality of communication devices can be realized.

In the above network relay system,
a relay route from a first device to a second device may be made redundant by a route passing through any one of the transfer processing units of the communication devices, and a route passing through the transfer processing unit of the plurality of communication devices and the external signal line.

Also, with the above redundant configuration, the same routing information can be set in the respective transfer processing units.

In the above network relay system,
the control unit of the respective communication devices may implement a system control of the operational system and the standby system through the control system repeater by hardware.

With the above configuration, in the multi-chassis configuration, a risk elimination of the double-acting and an increase in the system switching speed can be realized.

In the above network relay system,
one of the control units of the plurality of communication devices may be the operational system, and the control units of the other communication devices may be the standby system, and
the transfer processing units of the plurality of communication devices may be the operational systems.

Thus, a configuration of 1+m redundancy can be taken.
In the above network relay system,
two or more of the control units of the plurality of communication devices may be the operational systems, and the control units of the other communication devices may be the standby systems, and
the transfer processing units of the plurality of communication devices may be the operational systems.

With the above configuration, a configuration of n+m redundancy can be taken.

In the above network relay system,
the respective control system repeaters of the plurality of communication devices may be connected to each other by a ring configuration, and
when the control system repeater of the communication device of the standby system receives the routing information from the control system repeater of the other communication device, the control system repeater may set the routing information for the transfer processing unit of the subject communication device, and may transmit the routing information to the control system repeater of the other communication device.

With the above configuration, the control system repeaters are connected to each other by the ring configuration, and the costs can be emphasized.

In the above network relay system,
the respective control system repeaters of the plurality of communication devices may be connected to each other by a full mesh configuration.

With the above configuration, the control system repeaters are connected to each other by the full mesh configuration, and the reliability can be emphasized.

According to the second solving means of the present invention, there is provided a communication device in a network relay system including the plurality of communication devices, each of the communication devices comprising:
a transfer processing unit that transfers an input packet according to routing information; and
a control unit having a processing unit that learns the routing information and a control system repeater, which is set in an operational system or a standby system, wherein
the transfer processing unit and a transfer processing unit of another communication device can realize a non-blocking communication with each other,
the control system repeater of the control unit, when the control system repeater of the control unit is set in the operational system, receives the routing information from the processing unit, sets the routing information for the transfer processing unit of the subject communication device, and transmits the routing information to the control system repeater of another communication device, and
the control system repeater of the control unit, when the control system repeater of the control unit is set in the standby system, receives the routing information from the control system repeater of another communication device, and sets the routing information for the transfer processing unit of the subject communication device.

With the above configuration, it is possible to provide a communication device configuring the network relay device in which the local side and remote side transfer processing units (data planes) can be shown in the same fashion when viewed from the control unit (control plane), and the simplification of control and the prevention of the setting performance from being deterioration can be realized.

The non-blocking communication between the transfer engines can be realized, for example, as the following applied example.

Applied Example 1

A network relay device (communication device), comprising:
a connection unit having a first external interface which is a connection interface with an external;

an internal signal line having a total bandwidth which is equal to or larger than a total of bandwidths of lines in the connection unit; and a transfer unit connected to the connection unit by the internal signal line to transfer a received packet received through the connection unit, wherein the transfer unit includes a second external interface for connection to the other network relay device, and the second external interface and the second external interface of the other network relay device can be connected to each other by an external signal line having a total bandwidth which is equal to or larger than a total of bandwidths of lines in the connection unit.

With the above configuration, there can be provided the network relay device that can construct the virtual network relay device that can use all of the external ports, and can realize the non-blocking communication, without need of an additional device.

Also, the second external interface provided in the transfer unit of the network relay device, and the second external interface provided in the transfer unit of the other network relay device can be connected to each other by the external signal line having a total bandwidth which is equal to or larger than a total of bandwidths of lines in the connection unit. As a result, there can be provided the network relay device that can construct the virtual network relay device that can use all of the external ports, and can realize the non-blocking communication, without need of an additional device.

Applied Example 2

The network relay device according to the applied example 1, wherein the transfer unit includes:

a first transfer mode for outputting the received packet from the second external interface associated with the first external interface that receives the received packet in advance; and a second transfer mode for outputting the received packet from the first external interface or the second external interface which is determined from a destination of the received packet, and the transfer unit further includes:

a mode control unit that switches between the first transfer mode and the second transfer mode.

With the above configuration, the transfer unit can switch between the first transfer mode for outputting the received packet from the second external interface associated with the first external interface that receives the received packet in advance, and the second transfer mode for outputting the received packet from the first external interface or the second external interface which is determined according to a destination of the received packet.

Applied Example 3

The network relay device according to the applied example 1 or 2, further comprising: a plurality of the transfer units, wherein each of the plurality of transfer units is connected to the connection unit by the internal signal line, and the second external interface and the second external interface of the other network relay device can be connected to each other by the external signal line.

With the above configuration, in the configuration having the plurality of transfer units, the same advantages as those in the applied example 1 can be obtained.

Applied Example 4

The network relay device according to the applied example 3, wherein the plurality of transfer units each include:

the transfer unit set in the first transfer mode; and the transfer unit set in the second transfer mode.

With the above configuration, the network relay device includes the transfer unit set in the first transfer mode where a power consumption is low, and the transfer unit set in the second transfer mode where the power consumption is high. As a result, the power consumption can be reduced as the entire network relay device.

Applied Example 5

The network relay device according to one of the applied examples 1 to 4, wherein the connection unit further includes:

a load distribution processing unit that distributes the received packet to a plurality of routes when there is the plurality of routes from the connection unit to the transfer unit.

With the above configuration, the load distribution processing unit distributes the received packet to the plurality of routes when there is the plurality of routes from the connection unit to the transfer units. As a result, the traffic within the network relay device can be distributed.

Applied Example 6

The network relay device according to the applied example 5, wherein the load distribution processing unit approximately equalizes the distribution of the received packet to the plurality of routes.

With the above configuration, the load distribution processing unit approximately equalizes the distribution of the received packet to the plurality of routes. As a result, the distribution of the traffic within the network relay device can be approximately equalized.

Applied Example 7

The network relay device according to the applied example 5 depending from the applied example 3 or 4, wherein the load distribution processing unit distributes the received packet to the routes of a part of the transfer units.

With the above configuration, because the load distribution processing unit distributes the received packet to the routes for a part of the transfer units, the transfer unit to which the received packet is not distributed can be kept in a sleep state. As a result, the transfer unit of a backup system (standby system) can be provided within the network relay device.

Applied Example 8

The network relay device according to the applied example 5 depending from the applied example 3 or 4, wherein the load distribution processing unit distributes the received packet to the route for the transfer unit set in the second transfer mode when an output destination of the received packet determined according to a destination of the received packet belongs to the first external interface, and distributes the received packet to the route for the transfer unit set in the first transfer mode when the output destination of the received packet determined according to the destination of the received packet belongs to the other network relay device.

With the above configuration, the load distribution processing unit distributes the received packet to the route for the transfer unit set in the second transfer mode when an output destination of the received packet determined according to the destination of the received packet belongs to the first external interface, and distributes the received packet to the route for the transfer unit set in the first transfer mode when the output destination of the received packet determined according to the destination of the received packet belongs to the other network relay device. As a result, the network relay device having the output destination of the received packet can conduct the processing of the second transfer mode.

Applied Example 9

The network relay device according to one of the applied examples 2 to 8, further comprising:
a mode change unit that changes the transfer unit set in the first transfer mode to the second transfer mode if a failure in the other network relay device is detected.

With the above configuration, the mode change unit changes the transfer unit set in the first transfer mode to the second transfer mode when the mode change unit detects a failure of the other network relay device. For that reason, the network relay device that is in failure can be automatically separated.

Applied Example 10

A network system, comprising:
a first network relay device; and
a second network relay device, wherein
each of the first network relay device and the second network relay device includes:
a connection unit having a first external interface which is a connection interface with an external;
an internal signal line having a total bandwidth which is equal to or larger than a total of bandwidths of lines in the connection unit; and
a transfer unit connected to the connection unit by the internal signal line, transfers the received packet received through the connection unit, and having a second external interface which is connected to the other network relay device, and
the second external interface of the first network relay device and the second external interface of the second network relay device are connected to each other by an external signal line having a total bandwidth which is equal to or larger than any larger value of a total of the bandwidths of lines in the connection unit of the first network relay device, and a total of the bandwidths of lines in the connection unit of the second network relay device.

With the above configuration, the second external interface of the first network relay device and the second external interface of the second network relay device are connected to each other by an external signal line having a total bandwidth which is equal to or larger than any larger value of a total of the bandwidths of the lines in the connection unit of the first network relay device, and a total of the bandwidths of lines in the connection unit of the second network relay device. As a result, there can be provided the virtual network relay device (network system) that can use all of the external ports, and can realize the non-blocking communication, without need of an additional device.

Applied Example 11

The network system according to the applied example 10, wherein
each of the transfer unit of the first network relay device and the transfer unit of the second network relay device includes:
a first transfer mode for outputting the received packet from the second external interface associated with the first external interface that receives the received packet in advance; and
a second transfer mode for outputting the received packet from the first external interface or the second external interface which is determined from a destination of the received packet, and
each of the transfer unit of the first network relay device and the transfer unit of the second network relay device further includes:
a mode control unit that switches between the first transfer mode and the second transfer mode.

With the above configuration, the transfer unit of the first network relay device and the transfer unit of the second network relay device can switch between the first transfer mode and the second transfer mode.

Applied Example 12

The network system according to the applied example 10 or 11, wherein
each of the first network relay device and the second network relay device includes a plurality of the transfer units,
each of the plurality of transfer units is connected to the connection unit by the internal signal line, and
the second external interface of the first network relay device and the second external interface of the second network relay device are connected to each other by the external signal line.

With the above configuration, the same advantages as those in the applied example 10 can be also obtained in the configuration in which the first network relay device and the second network relay device include the plurality of transfer units.

Applied Example 13

The network system according to the applied example 12, wherein
each of the plurality of transfer units of the first network relay device and the plurality of transfer units of the second network relay device includes:
the transfer unit set in a first transfer mode; and
the transfer unit set in a second transfer mode,
the transfer unit set in the first transfer mode of the first network relay device and the transfer unit set in the second transfer mode of the second network relay device are connected to each other by the external signal line, and
the transfer unit set in the second transfer mode of the first network relay device and the transfer unit set in the first transfer mode of the second network relay device are connected to each other by the external signal line.

With the above configuration, each of the plurality of transfer units in the first network relay device and the plurality of transfer units in the second network relay device includes the transfer unit set in the first transfer mode where a power consumption is low, and the transfer unit set in the second transfer mode where the power consumption is high. As a result, the power consumption can be reduced as the entire network relay device.

Applied Example 14

The network system according to the applied example 12, wherein all of the plurality of transfer units of the first network relay device are set in a first transfer mode, all of the plurality of transfer units of the second network relay device are set in a second transfer mode, and the transfer units set in the first transfer mode of the first network relay device and the transfer units set in the second transfer mode of the second network relay device are connected to each other by the external signal line.

With the above configuration, all of the plurality of transfer units in the first network relay device are set in the first transfer mode where the power consumption is low. As a result, the power consumption can be reduced as the overall network system.

Applied Example 15

The network system according to the applied example 12, wherein all of the plurality of transfer units of the first network relay device are set in a second transfer mode, all of the plurality of transfer units of the second network relay device are set in a second transfer mode, and the transfer units set in the second transfer mode of the first network relay device and the transfer units set in the second transfer mode of the second network relay device are connected to each other by the external signal line.

With the above configuration, the plurality of transfer units in the first network relay device, and the plurality of transfer units in the second network relay device are all set in the second transfer mode that enables an output corresponding to the destination of the received packet. As a result, the processing performance as the overall network system can be improved.

The present invention can be realized by various modes. For example, the present invention can be realized by modes of the network relay device, the method of controlling the network relay device, the network system, a method of controlling the network system, a computer program for realizing functions of those method or devices, and a storage medium on which the computer program is recorded.

Advantageous Effects of Invention

It is possible, according to the present invention, to provide a network relay device that can configure a virtual network relay device that can use all of the external ports and can realize a non-blocking communication without requiring an additional device.

It is possible, according to the present invention, to realize the simplification of control and the prevention of a setting performance from being deterioration while showing a local side data plane and a remote side data plane in the same fashion when viewed from a control plane.

Also, according to the present invention, not only the simplification of control and the prevention of the setting performance from being deterioration can be realized, but also the following additional functions are installed in the control system repeater of the present invention, thereby being capable of expecting the following advantageous effects.

1) The control system repeater has a function of copying the route setting on the local side to the remote side.

According to this configuration, because there is no need to concern about the number of devices in the remote side data plane when viewed from the operational system control plane, the effect of extending the scalability is provided.

2) The system control signal corresponding to the conventional single-chassis is exchanged through the control system repeater, to thereby realize the system control using hardware.

According to this configuration, even in the MC, the risk elimination of the double-acting and the increase in the speed of the system switching can be realized.

DESCRIPTION OF EMBODIMENTS

1. First Embodiment

Figure 21:
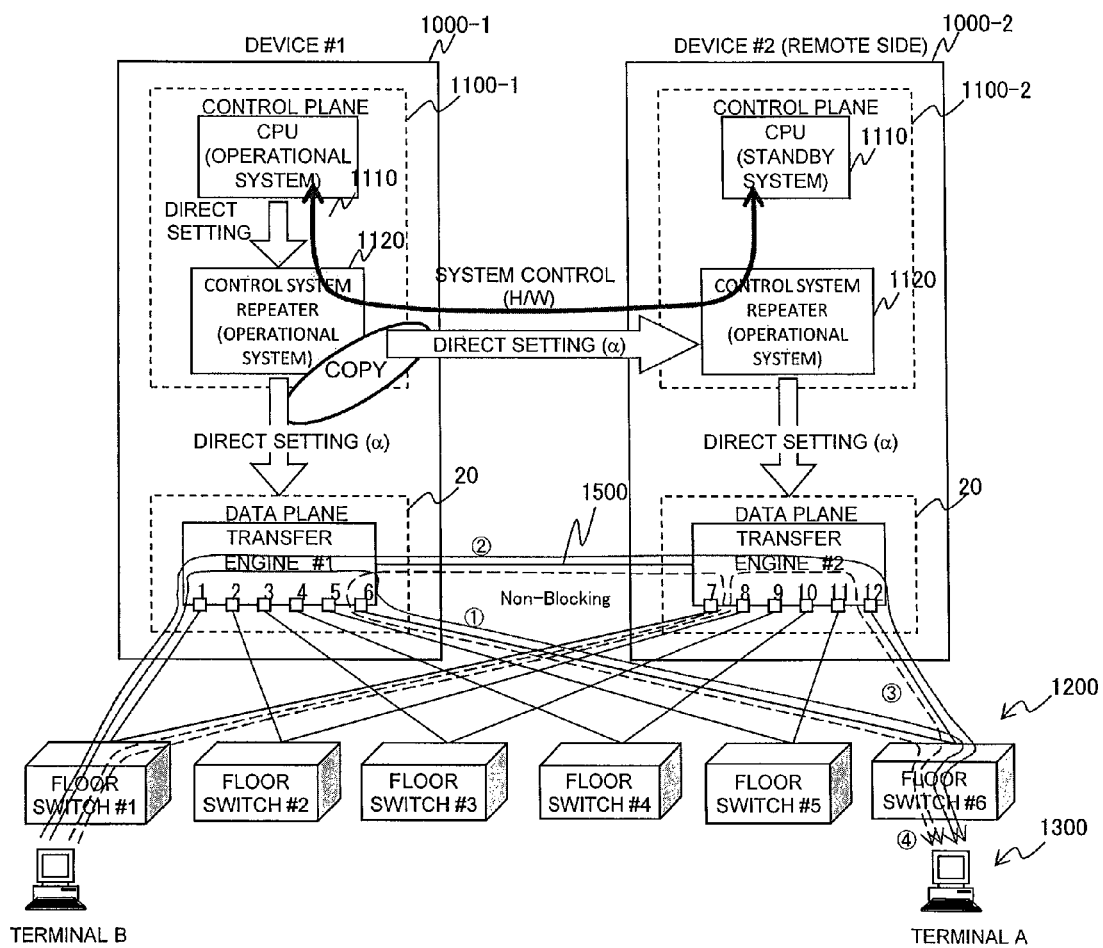
FIG. 21 is a configuration diagram illustrating a network relay system according to a first embodiment of the present invention.
Figure 22:
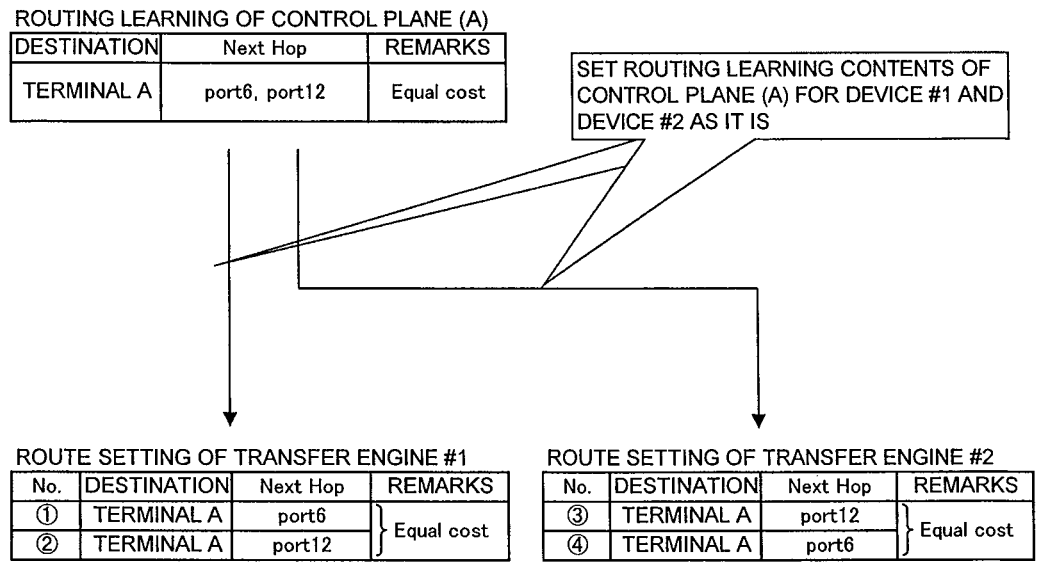
FIG. 22 is an illustrative view illustrating setting of routing learning contents.

FIG. 21 is a configuration diagram of a network relay system according to a first embodiment. FIG. 22 is an illustrative view illustrating setting of routing learning contents. The network relay system (high reliability virtualization device) includes a plurality of communication devices (network relay devices) 1000. In this example, the network relay system will be described with two redundancies of communication devices 1000-1 and 1000-2.

Each of the communication devices 1000 includes a data plane (transfer processing unit) 20 having a transfer engine, and a control plane (control unit) 1100 having a CPU (processing unit) 1110 and a control system repeater 1120. The transfer engine is connected to, for example, terminals 1300 through floor switches 1200. A transfer engine #1 of the communication device #1 (1000-1) and a transfer engine #2 of the communication device #2 (1000-2) are connected to the common floor switches 1200 to make a redundant communication route.

The data plane 20 transfers an input packet according to routing information. The respective data planes 20 of the respective communication devices 1000 are connected to each other by an external signal line 1500 so as to realize a non-blocking communication. Although will be described later, the data plane 20 include a connection unit (interface for connection to the floor switch in an example of the figure) having an external interface which is a connection interface with an external, and a transfer unit that transfers a received packet received through the connection unit. The respective transfer units of the communication devices 1000 are connected to each other by the external signal line 1500 having a total bandwidth which is equal to or larger than a total of the bandwidths of the lines in the connection unit of a given communication device 1000 (non-blocking).

A traffic from a terminal B (first device) to a terminal A (second device) arrives at the terminal A, for example, through any one of a route (circled number 1 in the figure) input from a port 1 of the transfer engine #1 and output to a port 6 of the transfer engine #1, a route (circled number 2 in the figure) input from the port 1 of the transfer engine #1 and output to a port 12 of the transfer engine #2 through the external signal line (redundancy dedicated circuit) 1500, a route (circled number 3 in the figure) input from a port 7 of the transfer engine #2 and output to the port 12 of the transfer engine #2, and a route (circled number 4 in the figure) input from the port 7 of the transfer engine #2 and output from the port 6 of the transfer engine #1 through the external signal line 1500.

The CPU 1110 of the control plane 1100 is set an operation system or a standby system, and learns the routing information. The control system repeater 1120 is set as the operational system or the standby system. In a control plane 1100-1 of the operational system, the routing information learned in the CPU 1110 is output to the control system repeater 1120, and the control system repeater 1120 sets the routing information in the data plane 20 (for example, a routing table 160 which will be described later) of the subject communication device (1000-1), and, for example, copies the routing information, and transmits the routing information to the control system repeater 1120 of the other communication device 1000-2. The control system repeater 1120 of the control system repeater 1120 of the standby system receives the routing information from the control system repeater 1120 of the other communication device 1000-1, and sets the routing information in the data plane 20 (for example, a routing table 160 which will be described later) of the subject communication device 1000-2. The control unit 1100 may include a system switching unit that switches the operational system/standby system of the CPU 1110 and the control system repeater 1120.

As described above, in order to solve the problem with the high reliability device using the conventional MC, in the network relay system according to this embodiment, "non-blocking" is ensured for the traffic between the communication devices by the transfer technique extending a back plane. This is disclosed in Japanese Patent Application filed previously (Japanese Patent application from which this application claims priority. Hereinafter referred to as "prior application"), and will be described in detail later. Non-blocking may be ensured for the traffic between the communication devices through an appropriate technique. The problem C) with the high reliability technique using the conventional MC is solved by ensuring non-blocking. That is, in the route setting from the control plane to the data plane, the same value may be set for the communication device #1 (1000-1) and the communication device #2 (1000-2) (FIG. 22).

The remaining problems are the problem D) the route setting performance, and the problem E) the system control. However, those problems can be solved by provision of the control system repeater 1120 in the communication devices 1000. Regarding the problem D), the control system repeater 1120 according to this embodiment has a function of copying the route setting on the local side (communication device #1 side, operational system side) to the remote side (communication device #2 side, standby system side). This copying function enables the route setting to the remote side data plane to be implemented at high speed. This means that there is no need to concern about the remote side data plane when viewed from the control plane 1100 of the operational system. Accordingly, the control plane 1100 of the operational system may not concern about the number of communication devices 1000 on the remote side (ensure the scalability).

Regarding the problem E), the system control (control of the operational system/standby system) corresponding to the conventional SC can be implemented through the control system repeater 1120 of this embodiment by hardware. In the conventional MC, for example, a health check packet is transmitted by a protocol, and it is confirmed whether a response packet can be received till time-out, or not, and if the time-out is reached, the standby system is switched to the operational system. However, there is a case in which the operational system normally operates even if the time-out is reached, and double-acting may occur. In this embodiment, the system control can be realized by the hardware, and the risk elimination of the double-acting and an increase in the speed of the system switching can be realized.

A specific example of the system switching control (the above-mentioned system control) using the control system repeater 1120 according to this embodiment will be described below.

The system switching control by the conventional MC cannot conduct the system switching to the other at high speed against a failure (for example, power failure, clock failure, CPU runaway (including runaway caused by software): hereinafter referred to as "specific failure") affecting the operation continuation of the control plane 1100 and a device in the CPU 1110 which controls the control plane, or the normal operation of the control plane.

In other words, the conventional MC is a method to switch the standby system to the operational system according to the protocol between the control planes, but not a method to directly know whether the specific failure is present within the mutual devices.

As an example of a method for detecting the specific failure and switching the system, there is a control method in which the software periodically mutually transmits the health check packet between the control planes, and it is confirmed that a response packet is returned from a counter partner, or not, to thereby realize the detection and the system switching. In this control system, a response waiting time-out occurs if the response packet from the counter partner cannot be received. If the response waiting time-out reaches specified conditions (for example, three times in succession for the purpose of preventing erroneous determination), it is determined that the operational system is in failure, and thereafter the standby system is switched to the operational system.

This leads to a problem that it takes time to switch the system to the other since the specified failure occurs.

The system switching control of the control system repeater 1120 according to this embodiment enables the control system repeater 1120 to directly know whether the specific failure (power failure, clock failure, CPU runaway) in the control plane 1100 and the CPU 1110 that controls the control plane is present within the mutual devices.

Specifically, the control system repeater 1120 has a function of detecting the specific failure at high speed by hardware, notifying the mutual control system repeaters of the detection result by hardware at high speed, and executing the system switching at high speed.

With the above configuration, according to the control system repeater 1120, even in the MC, an increase in the speed of the system switching control is realized, and the system switching performance as high as that in the SC can be performed.

The network relay system according to this embodiment has the advantages of the MC in that c) even if one communication device is down, the network system can continue to operate by the other communication device, and d) the number of user ports is extended. Accordingly, the network relay system according to this embodiment can provide the advantages c) and d) of the MC, and also solve the problems C) to E) with the MC.

On the other hand, as compared with the conventional SC, the network relay system according to this embodiment solves the problems of the SC that A) the failure (for example, front power supply) of the single portion causes the network system to be down, and B) there is no scalability of the number of user ports, and has the advantages of the SC that a) there is no setting difference in the transfer engine, and b) the system control by hardware is used in the CPU redundancy of the control plane.

2. Second Embodiment

Figure 23:
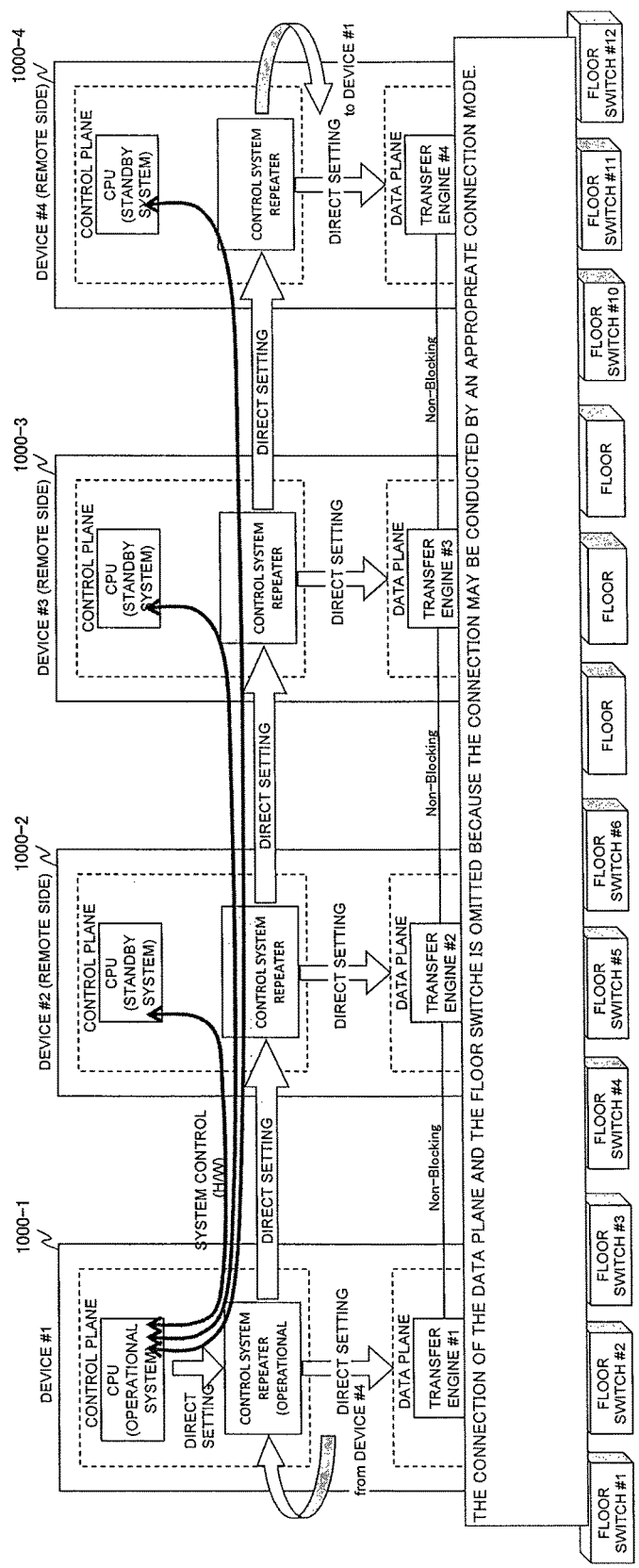
FIG. 23 is a configuration diagram illustrating a network relay system according to a second embodiment of the present invention.

FIG. 23 is a configuration diagram illustrating a network relay system according to a second embodiment of the present invention.

The network relay system according to this embodiment includes three or more communication devices 1000. In the configuration of the respective communication devices 1000, the same configuration as that in the first embodiment will be omitted from description, and differences therefrom will be described. The connection of the data plane and the floor switch may be conducted by an appropriate connection mode. As in the first embodiment, the respective floor switches may be connected to the respective transfer engines, but may be omitted because the figure becomes complicated.

In the network relay system, for example, one of the plurality of control planes 1100 is the operational system, the other control planes 1100 are the standby systems, and the data planes of m (m is a natural number of 2 or more) communication devices are the operational systems (1+m redundancy). Also, apart from 1+m redundancy, n+m redundancy may be applied (n is a natural number of 2 or more). For example, n control planes of the plurality of control planes 1100 are the operational systems, the other control planes 1100 are the standby systems, and all of the data planes of the m communication devices are the standby systems.

In the example illustrated in the figure, the respective control system repeaters are connected by a ring configuration for emphasizing the costs. In the ring configuration, for example, when the control system repeater 1120 of the standby system receives the routing information from the control system repeater 1120 of the other communication device 1000, the control system repeater 1120 sets the routing information for the data plane 20 of the subject communication device 1000, and transmits the routing information to the control system repeaters 1120 of the other communication devices 1000. The control system repeater 1120 of the operational system may terminate the received routing information.

The respective control system repeaters can be connected by full mesh for emphasizing the reliability. In the full mesh configuration, for example, the routing information may be transmitted from the control system repeater 1120 of the operational system to the respective control system repeaters 1120 of the standby systems.

The respective transfer engines may be connected by an appropriate connection mode other than the ring configuration as illustrated in the figure.

3. Example of Data Plane Realizing Non-Blocking Communication

The non-blocking between the respective transfer engines will be described below. The example of the non-blocking communication is disclosed in the prior application, and will be described with reference to drawings (FIGS. 1 to 18) of the prior application. Because of a difference (the prior application relates to the transfer unit whereas this application relates to the control unit) of the claims in the prior application and this application, in describing the example of the non-blocking in the prior application, a relevancy to the drawing (FIG. 21) in this application will be described.

The router 20 illustrated in the drawing of the prior application is described not as a broad-sense router as the communication device including the control unit and the transfer unit, but as a narrow definition router illustrating only the transfer unit. This router 20 has the same configuration and operation as those in the data plane 20 illustrated in the drawing (FIG. 21) of this application.

3-A. First Example of Non-Blocking (A-1) Schematic Configuration of Data Plane

Figure 1:
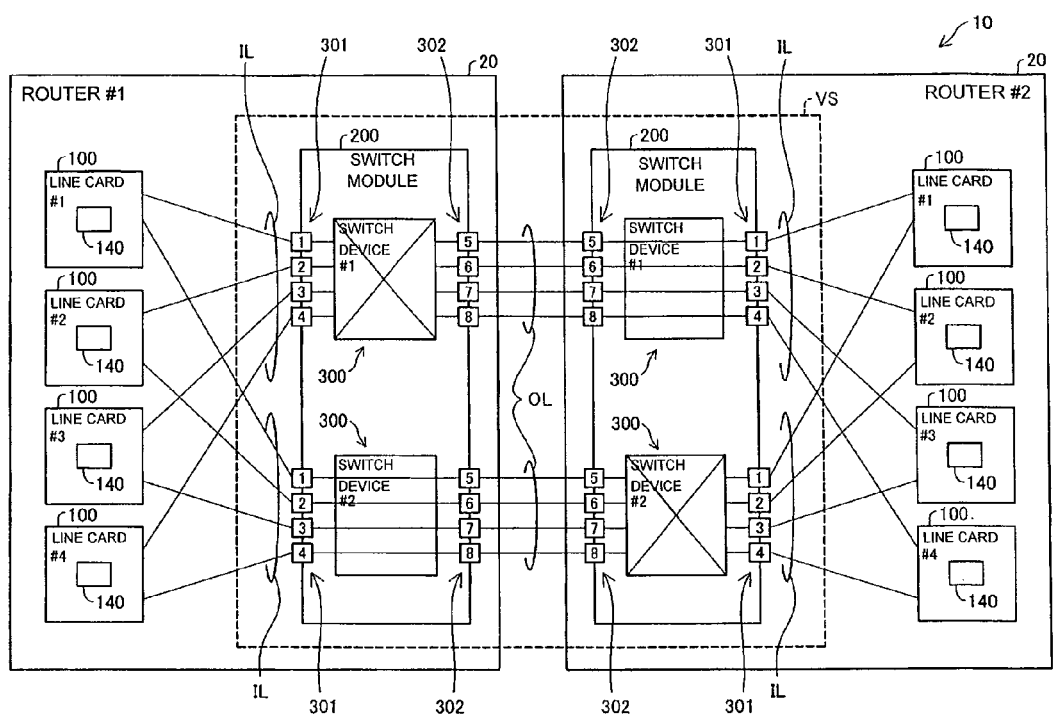
FIG. 1 is an illustrative view illustrating a schematic configuration of a data plane.

FIG. 1 is an illustrative view illustrating a schematic configuration of a data plane of a network relay system (hereinafter referred to as "network system") 10. Data planes 20 of two communication devices 1000 (indicated by router #1 and router #2 in the figure) have the same configuration, and conduct the same operation. The communication devices 1000 are called as the routers in the following description and drawings. Also, in the following description, only when the data plane 20 of the router #1 (communication device 1000-1) and the data plane 20 of the router #2 (communication device 1000-2) need to distinguish from each other, one of the data planes 20 is called "data plane #1", and the other is called "data plane #2", and in the description of the configuration and the operation of the data planes 20 per se, the data plane 20 is called "data plane 20". The same is applied to the other configuration units (for example, line cards, switch devices, etc.) mutually having the same sign in FIG. 1.

The router is the network relay device of a layer 3 that relays a communication using packets with another router or a terminal which is connected to the subject router. The data plane 20 includes four line cards 100 (line cards #1 to #4), and a switch module 200. The respective function units (the details will be described later) within the data plane 20 which will be described later are configured by a circuit including a central processing unit (CPU), a random access memory (RAM), and a read only memory (ROM). The CPU loads a control program, which has been stored in the ROM, into the RAM, and executes the control program to operate as the respective function units. The respective function units within the data plane 20 may be realized by an application specific integrated circuit (ASIC) or a field programmable gate array (FPGA). In FIG. 1, for convenience, a configuration portion of the data plane 20 unnecessary for description is omitted from illustration. The same is applied to the drawing which will be described later.

The line cards 100 as the connection units each include a plurality of ports which are connection interfaces with an external, and a load distribution processing unit 140 that distributes a received packet. The details of the other configuration portions of the line cards 100 will be described later.

The switch module 200 can be configured, for example, as a cross bus switch which is a switching circuit that relays the packet. The switch module 200 includes, for example, two switch devices 300 (switch devices #1 and #2). The switch devices 300 are integrated circuits for switching.

Each of the switch devices 300 as the transfer units has a function of transferring the received packets received through the line cards 100. The switch devices 300 each include a port 301 and a port 302. The port 301 is a generic name of connection interfaces identified by ports #1 to #4. The port 302 as a second external interface is a generic name of connection interfaces identified by ports #5 to #8. The port 302 is used for connection to the switch module 200 of the other communication device. The details of the other configuration portions of the switch devices 300 will be described later. In FIG. 1, for convenience of illustration, "#" of port numbers is omitted.

Each of the line cards 100 is connected to the respective ports 301 of the two switch devices 300 through internal signal lines. The internal signal line is a signal line used for communicating information between the line card 100 and the switch device 300, and can be formed of, for example, a copper line or an optical fiber. The number of internal signal lines may be one or plural so far as the internal signal line has a total bandwidth which is equal to or larger than a total of the bandwidths of lines in each line card 100. The "bandwidth of the line" means a total of the speeds of an uplink and a downlink.

In the example of FIG. 1, the line card #1 is connected to the port #1 of the switch device #1 and the port #1 of the switch device #2 through respective internal signal lines IL. Likewise, through the respective internal signal lines IL, the line card #2 is connected to the port #2 of the switch device #1 and the port #2 of the switch device #2, the line card #3 is connected to the port #3 of the switch device #1 and the port #3 of the switch device #2, and the line card #4 is connected to the port #4 of the switch device #1 and the port #4 of the switch device #2. For example, if a total of the bandwidths of the lines in the four line cards (line cards #1 to #4) provided in the router 20 is 50 Gbps, a total bandwidth of eight internal signal lines IL needs to be equal or larger than 50 Gbps.

The port 302 of each switch device 300 is connected to the port 302 (second external interface) of the other communication device (router) through external signal lines OL (the external signal line 1500 in FIG. 21). The external signal lines are signal lines used for communicating information between the switch devices 300 of both routers, and can be formed of, for example, a copper line or an optical fiber. Like the internal signal lines, the number of external signal lines may be one or plural so far as the external signal lines have a total bandwidth which is equal to or larger than a total of the bandwidths of lines in each line card 100.

In the example of FIG. 1, the port #5 of the switch device #1 in the router #1 and the port #5 of the switch device #1 in the router #2 are connected to each other through the external signal line OL. Likewise, the ports #6 to #8 of the switch device #1 in the router #1 and the ports #6 to #8 of the switch device # in the router #2 are connected to each other through the external signal lines OL, respectively. Likewise, the ports #5 to #8 of the switch device #2 in the router #1 and the ports #5 to #8 of the switch device #2 in the router #2 are connected to each other through the external signal lines OL, respectively. For example, if a total of the bandwidths of the four lines 100 provided in the router is 50 Gbps, a total bandwidth of eight external signal lines OL needs to be equal or larger than 50 Gbps.

As described above, the ports 302 of the switch devices 300 in the router #1 and the ports 302 of the switch devices 300 in the router #2 are connected to each other by the external signal lines OL, respectively. As a result, the switch module 200 of the router #1 and the switch module 200 of the router #2 cooperate with each other, and function as one virtual switching module VS (hereinafter also called "virtual transfer unit") which is imaginary. The details will be described later.

(A-2) Schematic Configuration of Line Card

Figure 2:
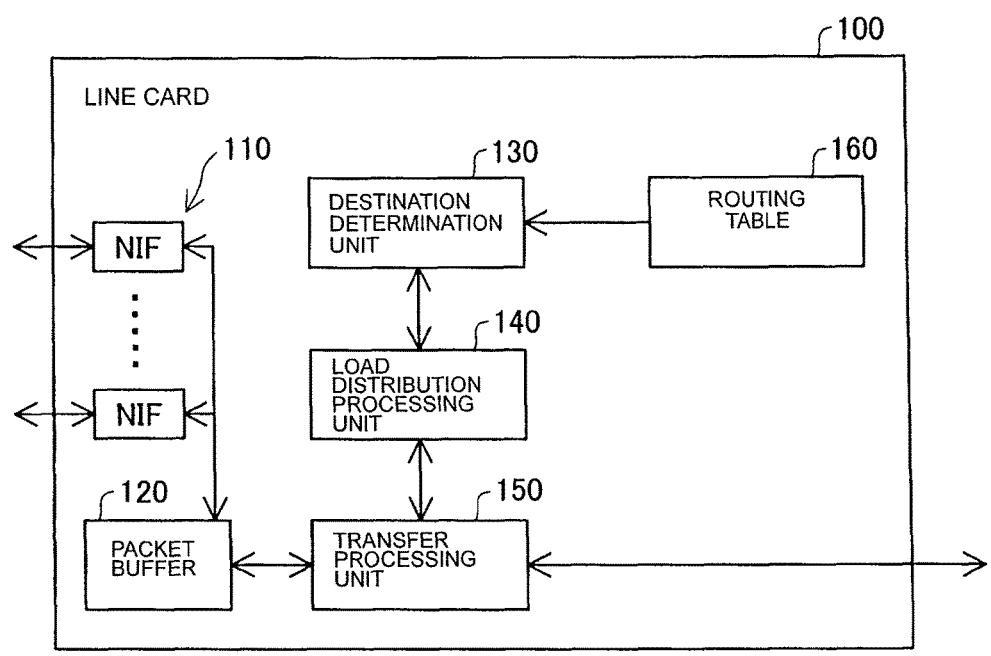
FIG. 2 is an illustrative view illustrating a schematic configuration of a line card.

FIG. 2 is an illustrative view illustrating a schematic configuration of each line card 100. The line card 100 as the connection unit includes a plurality of network interfaces (NIF) 110, a packet buffer 120, a destination determination unit 130, the load distribution processing unit 140, a transfer processing unit 150, and a routing table 160. The network interfaces 110 as the first external interface is a connection interface having an input/output port for connection to the external (for example, the other router or terminal). The type and the number of the network interfaces 110 can be arbitrarily set. For example, a variety of interfaces such as a LAN, a WAN, and an ATM can be provided. The packet buffer 120 is a buffer memory area for temporarily storing the packets input to or output from the network interfaces 110.

The destination determination unit 130 has a function of determining a destination of the input packet. The load distribution processing unit 140 has a function of distributing the input packets to a plurality of routes when there is the plurality of routes from the line cards 100 to the switch devices 300. The details of the processing in the destination determination unit 130 and the load distribution processing unit 140 will be described later. The transfer processing unit 150 has a function of transferring the packets to the respective portions within the line cards 100 and the switch module 200. The routing table 160 is a table that holds the routing information such as a relay destination of the packets, and corresponds to, for example, a MAC table or a routing table. The routing information of the routing table 160 is set by the control plane.

(A-3) Load Distribution Processing

Figure 3:
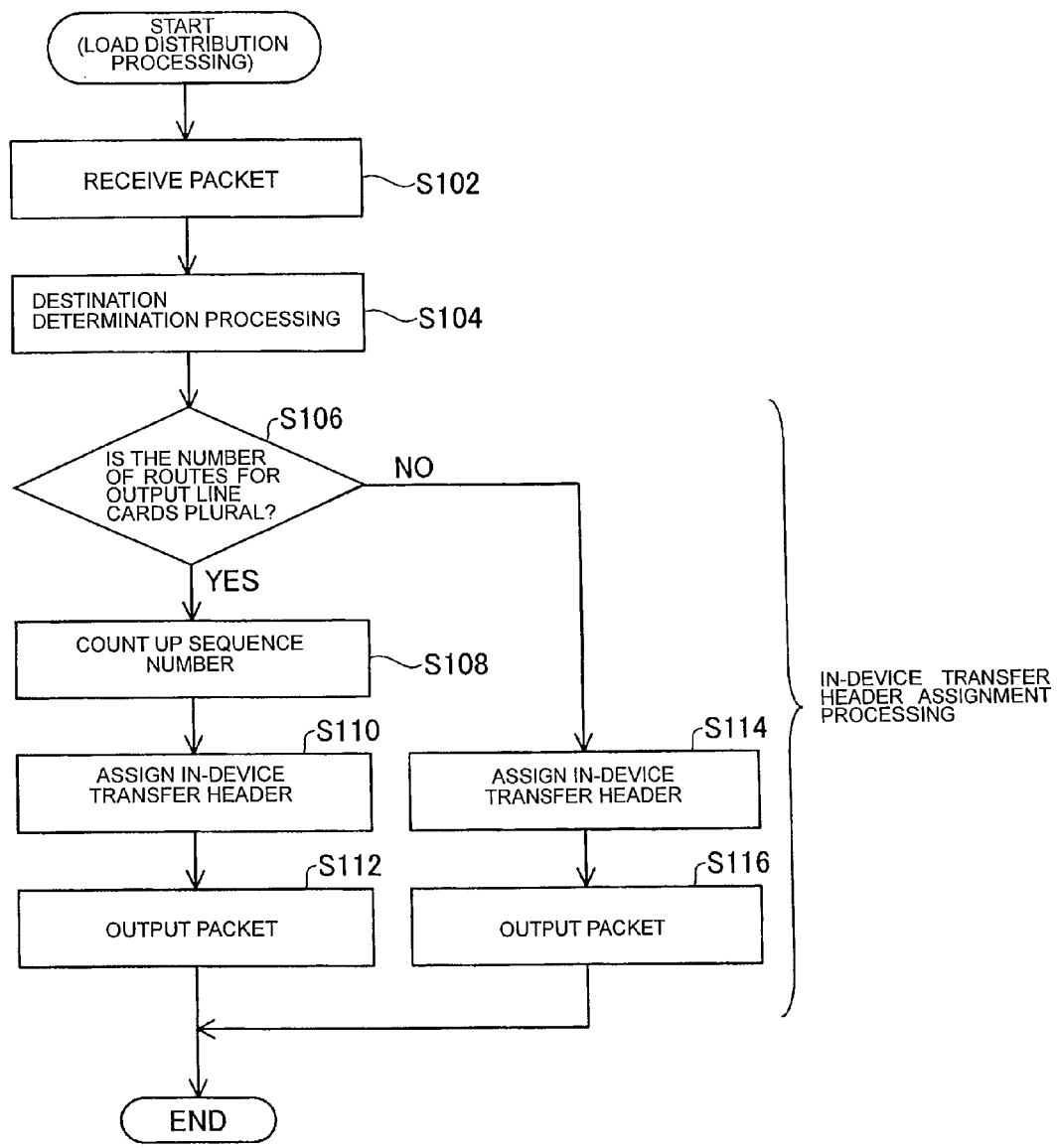
FIG. 3 is a flowchart illustrating a procedure of load distribution processing.

FIG. 3 is a flowchart illustrating a procedure of load distribution processing. The load distribution processing is processing which is executed when the data plane 20 receives the packets from the external. First, each line card 100 receives the packet from the external through the network interfaces 110 (Step S102). The received packet is stored in the packet buffer 120 once. The destination determination unit 130 conducts destination determination processing on the packet (hereinafter also called "processing packet") read from the packet buffer 120 (Step S104). Specifically, the destination determination unit 130 searches the routing table 160 on the basis of header information of the processing packet, and determines a transfer destination of the processing packet.

After the destination determination processing, the load distribution processing unit 140 conducts in-device transfer header assignment processing. Specifically, the load distribution processing unit 140 determines, according to the transfer destination of the processing packet determined in the destination determination processing, that is, an identifier of a line card to which the processing packet is to be output, whether the number of routes for the line card is plural, or not (Step S106). In the determination in Step S106, a table for storing a correspondence relationship between the input/output line card and the number of routes may be held within the line cards 100 in advance. Also, the number of routes may be obtained in each case. If the number of routes for the line card to which the processing packet is to be output is plural (yes in Step S106), the load distribution processing unit 140 counts up a sequence number which is an internal variable (Step S108). Then, the load distribution processing unit 140 assigns an in-device transfer header to the processing packet (Step S110).

Figure 4:
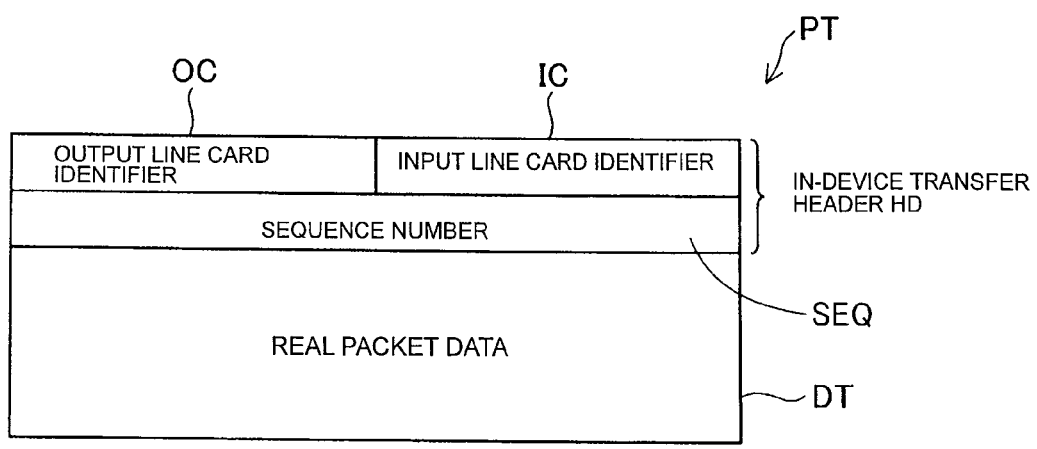
FIG. 4 is an illustrative view illustrating a structure of a packet to which an in-device transfer header has been assigned.

FIG. 4 is an illustrative view illustrating a structure of the packet to which the in-device transfer header has been assigned. A packet PT includes an in-device transfer header HD, and a real packet data DT. The in-device transfer header HD further includes an output line card identifier OC, an input line card identifier IC, and a sequence number SEQ. The identifier (for example, a MAC address, etc.) of the line card to which the processing packet is to be output is stored in the output line card identifier OC. The identifier (for example, a MAC address, etc.) of the line card that has received the processing packet is stored in the input line card identifier IC. The sequence number managed in Step S108 of the load distribution processing (FIG. 3) is stored in the sequence number SEQ. The sequence number SEQ is used in sequencing (the details will be described later) conducted on an output line card side. Data of the packet received through the network interfaces 110 is stored in the real packet data DT as it is.

After the in-device transfer header has been assigned, in Step S112 of FIG. 3, the load distribution processing unit 140 outputs the processing packet through the transfer processing unit 150. The load distribution processing unit 140 can control the traffics to the plurality of routes to be substantially equal to each other when outputting the processing packet. For example, when the load distribution processing unit 140 receives a plurality of packets having the same destination, and two routes for the destination are provided, the load distribution processing unit 140 can alternately output the packets to the two routes. Also, the load distribution processing unit 140 may store a total of packet sizes that have already been output to the two routes to determine a route to which the packet is then output.

In Step S106 of FIG. 3, if only one route for the line card to which the processing packet is to be output is present (no in Step S106), the load distribution processing unit 140 assigns the in-device transfer header thereto (Step S114). In this situation, the load distribution processing unit 140 may omit the sequence number SEQ of the in-device transfer header HD in the packet PT illustrated in FIG. 4. Also, the load distribution processing unit 140 may store the same sequence number (for example, 0, etc.). This is because since only one route for the output line card is present, the sequencing on the output line card side becomes unnecessary. After the in-device transfer header has been assigned, in Step S116 of FIG. 3, the load distribution processing unit 140 outputs the processing packet through the transfer processing unit 150.

(A-4) Schematic Configuration of Switch Module

Figure 5:
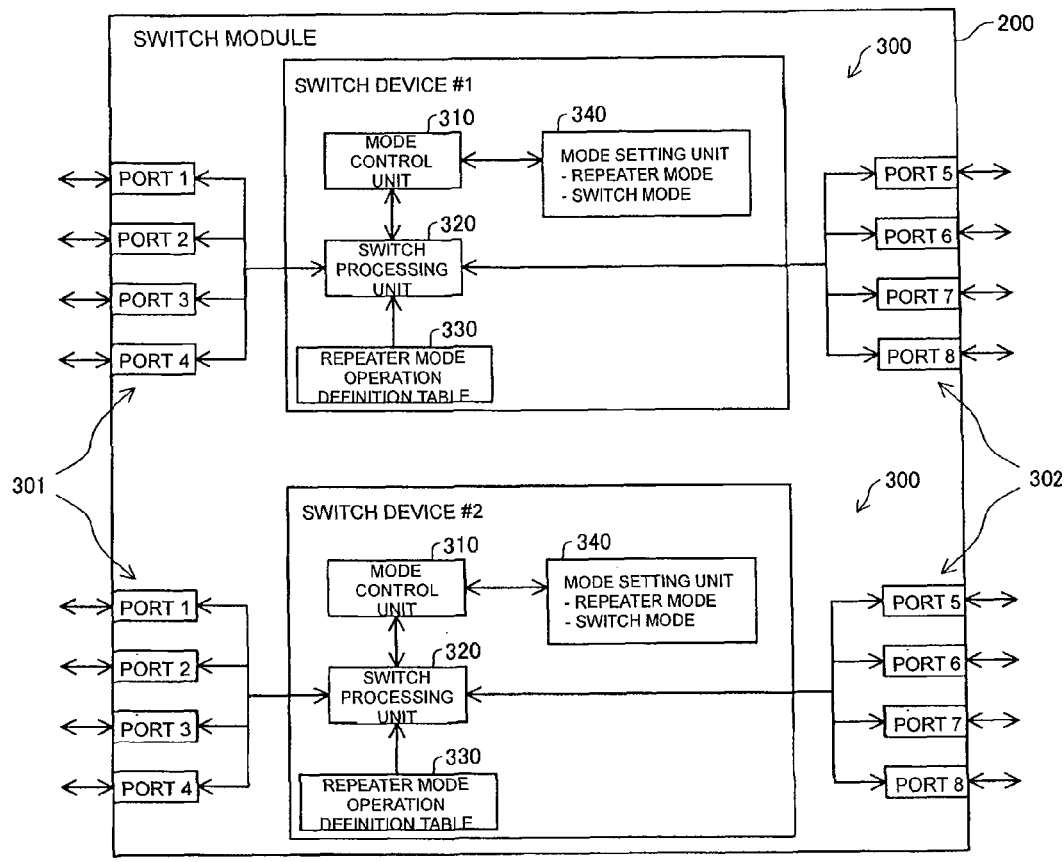
FIG. 5 is an illustrative view illustrating a schematic configuration of a switch module.

FIG. 5 is an illustrative view illustrating a schematic configuration of the switch module 200. The switch module 200 according to this example is configured to provide a plurality (two) of switch devices 300. The switch devices 300 as the transfer units each include the port 301, the port 302, a mode control unit 310, a switch processing unit 320, a repeater mode operation definition table 330, and a mode setting unit 340. The port 301 is a generic name of the connection interface identified by the ports #1 to #4. The port 302 as the second external interface is a generic name of the connection interface identified by the ports #5 to #8.

The mode control unit 310 has a function of switching a transfer mode of the switch devices 300 to another according to the setting contents of the mode setting unit 340. The transfer mode of the switch devices 300 includes a repeater mode as a first transfer mode, and a switch mode as a second transfer mode. Also, the mode control unit 310 also operates as a mode change unit which will be described later. The switch processing unit 320 executes the actual transfer processing according to the respective transfer modes. The repeater mode operation definition table 330 is a table referred to when the switch processing unit 320 operates as the repeater mode. The mode setting unit 340 is a storage unit that stores a setting value for determining the transfer mode of the switch device.

(A-5) Repeater Mode Transfer Processing

Figure 6:
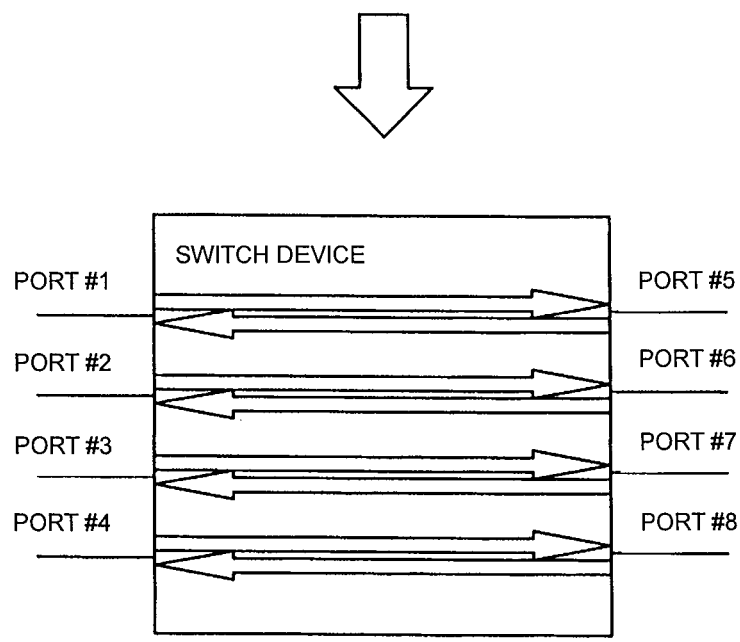
FIG. 6 is an illustrative view illustrating an example of a repeater mode operation definition table, and the operation of a repeater mode.

FIG. 6 is an illustrative view illustrating an example of the repeater mode operation definition table 330, and the operation of the repeater mode. The repeater mode operation definition table 330 illustrated on an upper stage of FIG. 6 includes an input port number field and an output port number field. The identifiers (numbers) of all the ports provided in the port 301 and the port 302 are stored in the input port number field. The respective identifiers of the ports associated with the ports specified by the identifiers stored in the input port number field in advance are stored in the output port number field. The correspondence of the input port numbers and the output port numbers can be arbitrarily determined. However, as in this example, under the circumstances where signal lines are arrayed, it is preferable that the correspondence between the input port numbers and the output port numbers is one-to-one where there is no overlapping with the other.

A lower stage of FIG. 6 is an illustrative view when the switch processing unit 320 operates in the repeater mode (first transfer mode). When the transfer mode is the repeater mode, the switch processing unit 320 first searches the repeater mode operation definition table 330 with the identifier of the port to which the processing packet is input in the switch devices 300 as a key. Thereafter, the switch processing unit 320 outputs the processing packet from the port specified by the identifier stored in the output port number field of the matched entry. Specifically, for example, the switch processing unit 320 outputs the packet from the port #5 associated with the port #1 in the repeater mode operation definition table 330 when the processing packet is input from the port #1.

That is, the correspondence between the input port numbers and the output port numbers in the repeater mode operation definition table 330 shows an input/output relationship of the packets when the switch processing unit 320 operates as the repeater mode (first transfer mode). Since the identifier (that is, a value of the input port number field) of the port to which the processing packet is input in the switch devices 300 is determined by the network interfaces 110 (first external interface) that have received the packet, the repeater mode operation definition table 330 represents the correspondence relationship between the network interfaces 110 by which the data plane 20 receives the packet, and the port 302 (second external interface) to which the packet is to be output.

Thus, when the switch processing unit 320 operates in the repeater mode, the switch processing unit 320 has only to output the processing packet from the output port determined with respect to the input port in advance regardless of the destination of the processing packet, and does not require complicated processing. For that reason, a low power consumption of the switch devices 300 can be kept.

(A-6) Switch Mode Transfer Processing

A description will be given of processing when the switch processing unit 320 operates in the switch mode (second transfer mode). When the transfer mode is the switch mode, the switch processing unit 320 subjects a logical port map received from the line card 100 together with the processing packet to bit map conversion with the use of a given conversion pattern. Specifically, the switch processing unit 320 converts the logical port map into a physical port map with the use of a converter circuit not shown. Thereafter, the switch processing unit 320 outputs the processing packet from a port corresponding to the converted bit map (physical port map). The logical port map can be set together with the routing search in the above-described destination determination processing.

Thus, when the switch processing unit 320 operates in the switch mode, the switch processing unit 320 requires the switching processing (that is, processing that outputs the packet to the output port corresponding to the destination of the processing packet) using the logical port map received together with the processing packet. For that reason, for that reason, the power consumption of the switch devices 300 becomes larger than that in the repeater mode.

(A-7) Operation of Network System

Figure 7:
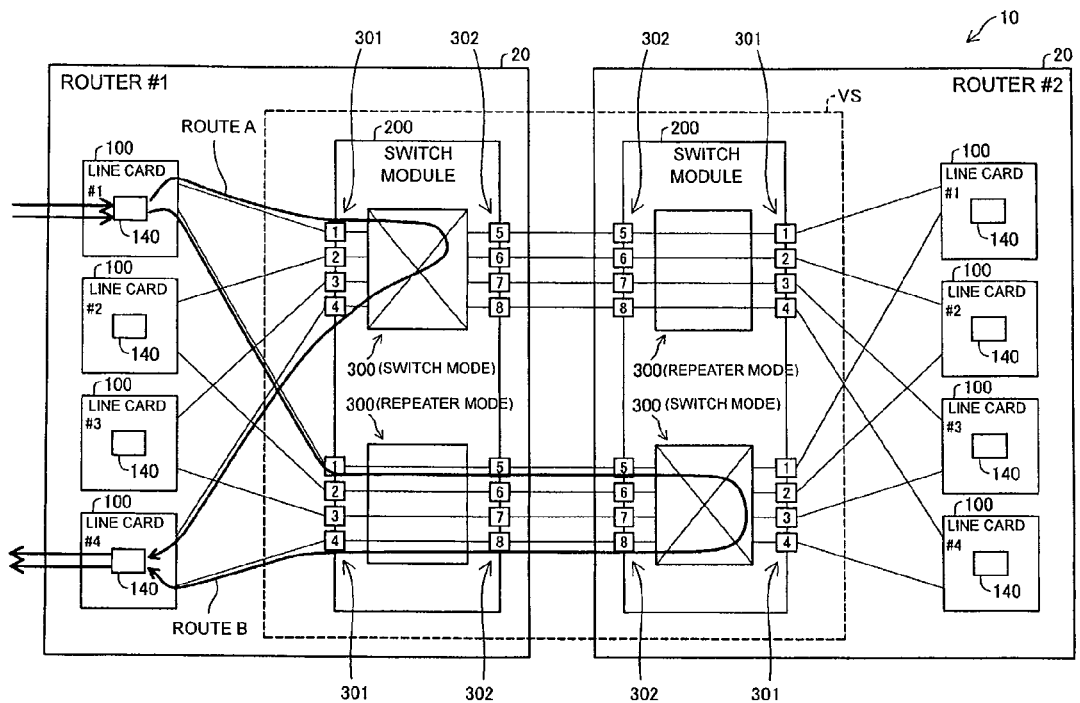
FIG. 7 is an illustrative view illustrating an example of an appearance in which a packet is transferred in a network system.

FIG. 7 is an illustrative view illustrating an example of an appearance in which the packet is transferred in the network system 10. In the network system 10 illustrated in FIG. 7, the switch device #1 of the router #1 and the switch device #2 of the router #2 have the transfer mode set to the switch mode. On the other hand, the switch device #2 of the router #1 and the switch device #1 of the router #2 have the transfer mode set to the repeater mode. That is, in the example of FIG. 7, the switch device #1 (router #2) set in the repeater mode and the switch device #1 (router #1) set in the switch mode are connected to each other by the external signal line. The switch device #2 (router #2) set in the switch mode and the switch device #2 (router #1) set in the repeater mode are connected to each other by the external signal line. In other words, one of the switch devices connected to each other by the external signal line is the switch mode, and the other switch device is the repeater mode.

In this case, the operation when the plurality of packets whose destination is the line card #4 of the router #1 are received from the line card #1 of the router #1 will be described. The load distribution processing unit 140 in the line card #1 of the router #1 assigns "1" to the sequence number SEQ (FIG. 4) for the packet that has first been processed through the load distribution processing (FIG. 3), and thereafter outputs the packet to, for example, a route A. The switch processing unit 320 of the switch device #1 of the router #1 that has received the packet which has been output to the route A conducts the above-mentioned switch mode transfer processing, and outputs the packet from the port #4 corresponding to a route search result. The line card #4 of the router #1 that has received the packet from the switch device #1 stores the received packet in the packet buffer 120.

The load distribution processing unit 140 in the line card #1 of the router #1 assigns "2" to the sequence number SEQ (FIG. 4) for the packet that has second been processed through the load distribution processing (FIG. 3), and thereafter outputs the packet to, for example, a route B. The switch processing unit 320 of the switch device #2 of the router #1 that has received the packet which has been output to the route B conducts the above-mentioned repeater mode transfer processing, and outputs the packet from the port #5 associated with the input port #1 in advance. The switch processing unit 320 of the switch device #2 of the router #2 that has received the packet from the router #1 conducts the above-mentioned switch mode transfer processing, and outputs the packet from the port #8 corresponding to a route search result. The switch processing unit 320 of the switch device #2 of the router #1 that has received the packet from the router #2 conducts the above-mentioned repeater mode transfer processing, and outputs the packet from the port #4 associated with the input port #8 in advance. The line card #4 of the router #1 that has received the packet from the switch device #2 stores the received packet in the packet buffer 120.

In the configuration of FIG. 7, because the number of routes from the line card is two, the load distribution processing unit 140 that has received the packet repeats the above-mentioned distribution to the routes A and B, and approximately equalizes the distribution of the load to the two switch devices.

Figure 8:
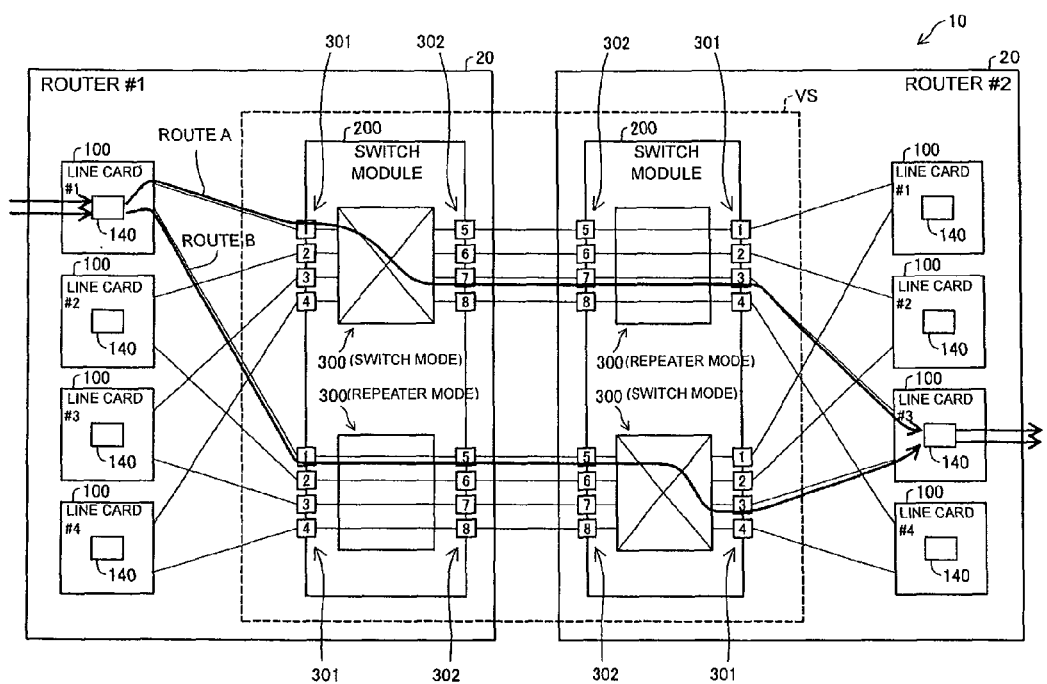
FIG. 8 is an illustrative view illustrating another example of the appearance in which the packet is transferred in the network system.

FIG. 8 is an illustrative view illustrating another example of the appearance in which the packet is transferred in the network system 10. The network system 10 of FIG. 8 has the same configuration as that of the network system 10 illustrated in FIG. 7. In this case, the operation when the plurality of packets whose destination is the line card #3 of the router #2 are received from the line card #1 of the router #1 will be described. The load distribution processing unit 140 in the line card #1 of the router #1 assigns "1" to the sequence number SEQ (FIG. 4) for the packet that has first been processed through the load distribution processing (FIG. 3), and thereafter outputs the packet to, for example, the route A. The switch processing unit 320 of the switch device #1 of the router #1 that has received the packet which has been output to the route A conducts the above-mentioned switch mode transfer processing, and outputs the packet from the port #7 corresponding to the route search result. The switch processing unit 320 of the switch device #1 of the router #2 that has received the packet from the router #1 conducts the above-mentioned repeater mode transfer processing, and outputs the packet from the port #3 associated with the input port #7 in advance. The line card #3 of the router #2 that has received the packet from the switch device #1 stores the received packet in the packet buffer 120.

The load distribution processing unit 140 in the line card #1 of the router #1 assigns "2" to the sequence number SEQ (FIG. 4) for the packet that has second been processed through the load distribution processing (FIG. 3), and thereafter outputs the packet to, for example, the route B. The switch processing unit 320 of the switch device #2 of the router #1 that has received the packet which has been output to the route B conducts the above-mentioned repeater mode transfer processing, and outputs the packet from the port #5 associated with the input port #1 in advance. The switch processing unit 320 of the switch device #2 of the router #2 that has received the packet from the router #1 conducts the above-mentioned switch mode transfer processing, and outputs the packet from the port #3 corresponding to the route search result. The line card #3 of the router #2 that has received the packet from the switch device #2 stores the received packet in the packet buffer 120.

As described above, according to this example, the second external interface (port 302) provided in the transfer unit (switch devices #1 and #2) in the communication device (router #1), and the second external interface (port 302) provided in the transfer unit (switch devices #1 and #2) in the other communication device (router #2) are connected to each other by the external signal lines OL having the total bandwidth which is equal to or larger than a total of the bandwidths of lines in the connection units (line cards #1 to #4). Also, one switch device connected by the external signal lines OL is the first transfer mode (repeater mode) that transfers the packet to the other router regardless of the destination of the processing packet, and the other switch device is the second transfer mode (switch mode) that transfers the packet to the output port corresponding to the destination of the processing packet. With this configuration, the switch devices #1 and #2 of the router #1 and the switch devices #1 and #2 of the router #2 cooperate with each other, and can transfer the received packet to the line cards #1 to #4 of the router #1 or the router #2 as the imaginary one virtual transfer unit VS. As a result, there can be provided the communication device (router) that can construct the virtual network relay device (high reliability virtualization device) that can use all of the external ports (network interfaces 110), without need of an additional device (for example, switching dedicated device, etc.). Also, in the virtual network relay device (high reliability virtualization device) according to this example, since the respective units are connected to each other by the internal signal lines and the external signal lines having the total bandwidth which is equal to or larger than a total of the bandwidths of lines in the line cards 100, the non-blocking communication can be realized.

Further, in the network system 10 according to this example, one switch device connected by the external signal lines OL constructs the virtual transfer unit VS as the repeater mode that is low in the power consumption without need of complicated processing, and the other switch device constructs the virtual transfer unit VS as the switch mode that conducts the switching processing. For that reason, the power consumption of the virtual transfer unit VS can be reduced as compared with a case in which all of the switch devices within the virtual transfer unit VS operate as the switch mode. Also, the power consumption can be reduced even when viewed by a single router.

Further, the network system 10 according to this example includes the load distribution processing unit 140 in each of the line cards. Because the load distribution processing unit 140 distributes the received packets to the plurality of routes, the load distribution processing unit 140 can distribute the traffic within the routers #1 and #2, and the traffic between the routers #1 and #2. Further, as described above, when the load distribution processing unit 140 substantially equalizes the distribution of the received packets to the plurality of routes, the load distribution processing unit 140 can also substantially equalize the distribution of the traffic within the routers #1 and #2, and the traffic between the routers #1 and #2.

(A-8) Sequencing

Figure 9:
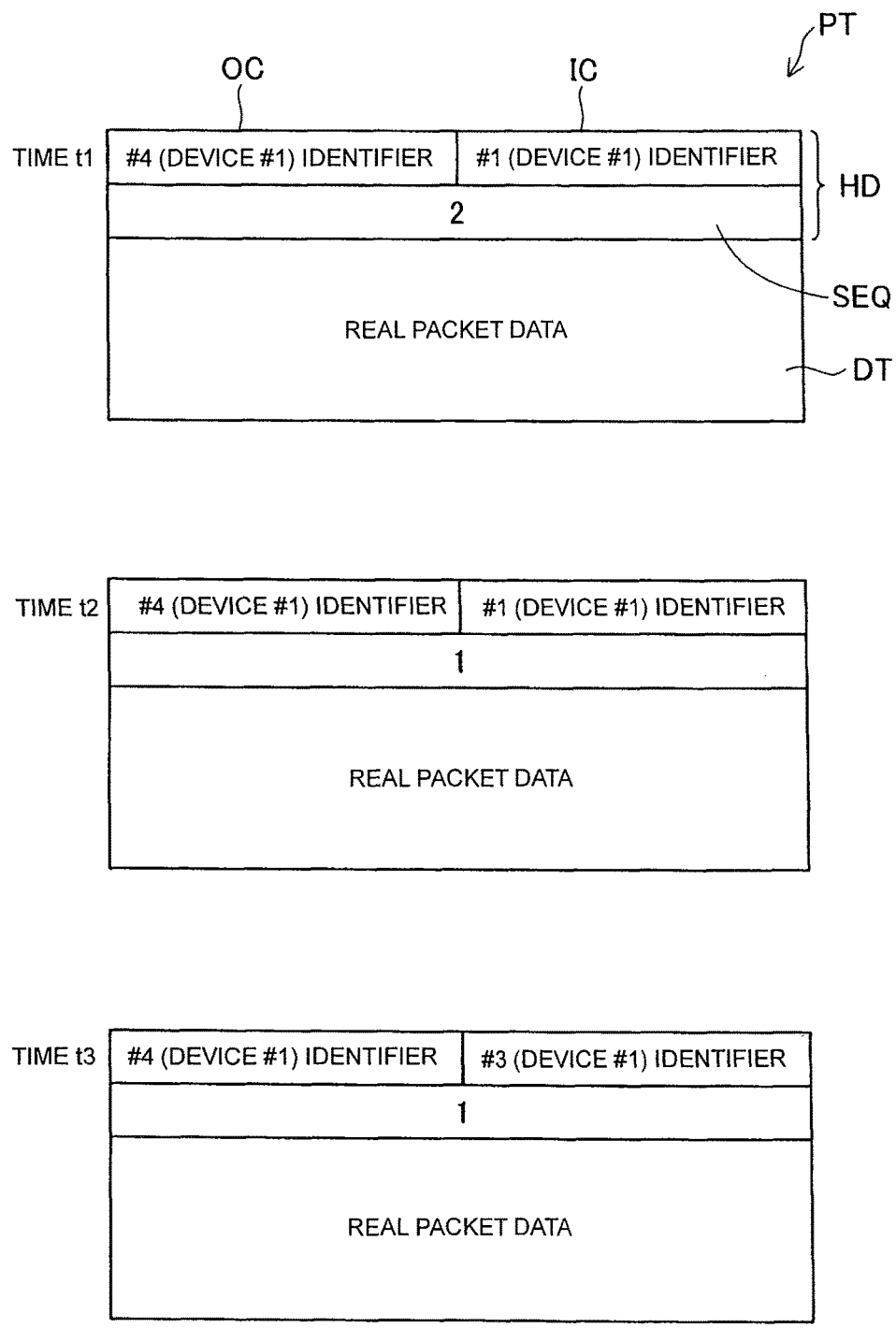
FIG. 9 is a schematic diagram illustrating sequencing.

FIG. 9 is a schematic diagram illustrating sequencing. The sequencing is a control that is executed for matching a sequence of the received packets in the line cards 100 that has received the packets from the switch devices 300. FIG. 9 illustrates the packets PT that are received by the line cards 100 and stored in the packet buffer 120 at times t1, t2, and t3. The load distribution processing unit 140 of the line cards 100 reads the packets stored in the packet buffer 120 at given intervals, and conducts sequencing in the following steps. The sequencing can be realized, for example, by using a dedicated sequencing circuit.

Step 8-1) The load distribution processing unit 140 groups the packets stored in the packet buffer 120 with the input line card identifiers IC (identifiers of the line cards that have received the packets) as keys.

Step 8-2) The load distribution processing unit 140 rearranges the packets belonging to the same group, that is, the packets having the same identifier of the received line card by using the sequence number SEQ.

Step 8-3) The load distribution processing unit 140 outputs the rearranged packets from the network interfaces 110 according to a given scheduling.

In the example of FIG. 9, for example, when the load distribution processing unit 140 conducts sequencing according to a schedule that "the packets are output in ascending order of the input line card identifiers IC", the received packet (input line card #1, sequence number 1) at the time t2, the received packet (input line card #1, sequence number 2) at the time t1, and the received packet (input line card #3, sequence number 1) at the time t3 are output in the stated order.

With the above operation, the plurality of packets transmitted to the different routes by the load distribution processing (FIG. 3) can be arranged in order at the time of reception, and then output from the network interfaces 110.

(A-9) Operation of Network System (when a Failure Occurs)

Figure 10:
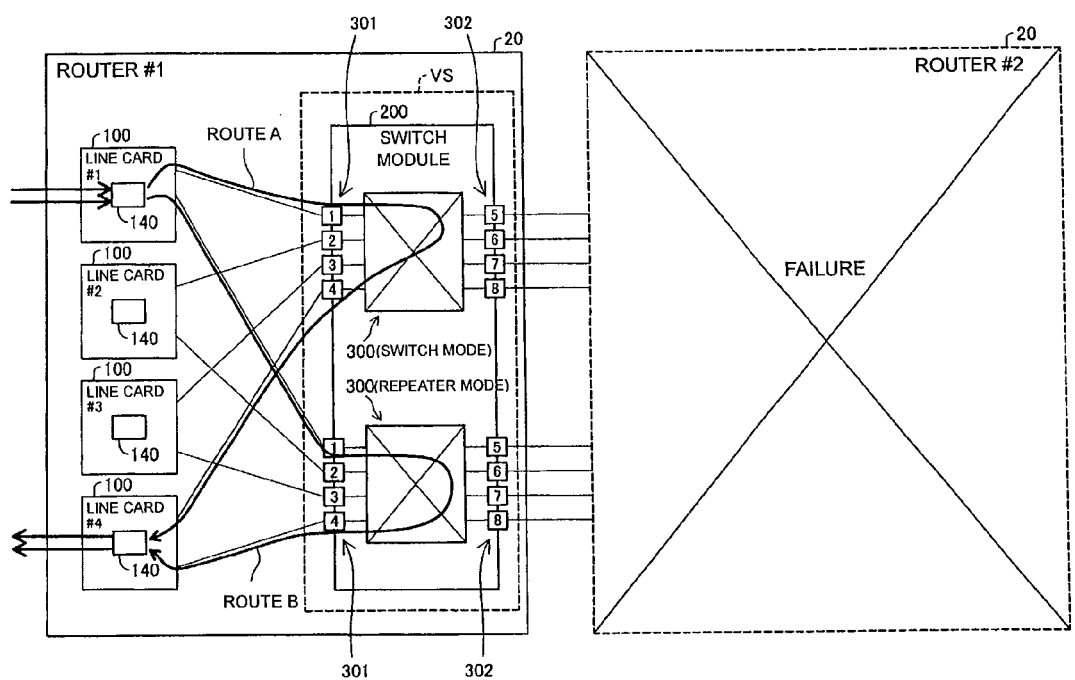
FIG. 10 is an illustrative view illustrating an example in which a failure occurs in a router configuring the network system.

FIG. 10 is an illustrative view illustrating an example in which a failure (failure affected on the data plane) occurs in a router configuring the network system 10. When the network system 10 operates as described in FIGS. 7 and 8, the mode control units 310 (mode change units) of the respective switch devices of the routers #1 and #2 transmit signals for mutual existence confirmation to each other. Then, when the mode control units 310 cannot receive the signals for the mutual existence for a given time, the mode control unit 310 (mode change unit) determines that a failure occurs in the router of the counter partner (or the data plane of the counter partner router), and conducts the following processing.

Step 9-1) The mode control unit 310 (mode change unit) confirms the present transfer mode with reference to the mode setting unit 340.

Step 9-2) When the present transfer mode is the repeater mode, the mode control unit 310 (mode change unit) changes the mode setting unit 340 to the switch mode.

FIG. 10 illustrates a condition in which the failure occurs in the router #2, and the above Steps 9-1 and 9-2 have been executed. The switch device #2 of the router #1 set in the repeater mode before a failure occurs in the router #2 (FIG. 7), is changed to the switch mode. With this operation, the processing packet assigned to the route B is subjected to switch mode transfer processing in the switch device #2 of the router #1, and output from the port #4 corresponding to the route search result. That is, because the switch devices #1 and #2 of the router #1 can be operated as a new virtual transfer unit VS by switching the above transfer mode, the router #1 that is not in failure can continue processing without degenerating the switching bandwidth (that is, while ensuring the processing performance).

In this example, the mode change unit is included in the mode control unit 310 (a part of the functions of the mode control unit 310). Alternatively, the functions of the mode change unit may be realized by another configuration. For example, a control unit (or the above-mentioned control plane) independent from the line card or the switch mode may be provided in each router to realize the functions of the mode change unit in the control unit. Also, the above detection method for the failure is exemplary, and a variety of methods can be applied.

With the above configuration, when the mode change unit detects a failure in the other communication device configuring the network system 10, the mode change unit changes the transfer unit of the first transfer mode (repeater mode) to the second transfer mode (switch mode). As a result, the mode change unit can automatically separate the other communication device that is in failure. Also, the communication device that is not in failure can continue processing without degenerating the switching bandwidth. This also leads to the redundancy of the network system 10.

(A-10) The Other Configurations of Network System

Figure 11:
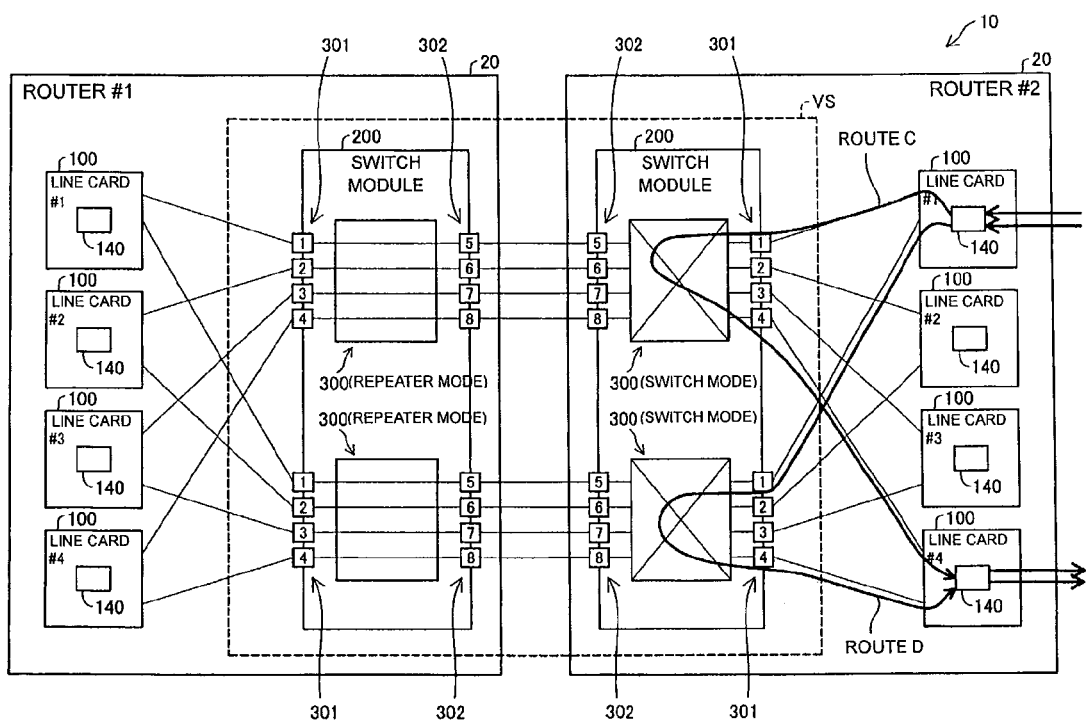
FIG. 11 is an illustrative view illustrating an example of another configuration of the network system.

FIG. 11 is an illustrative view illustrating an example of another configuration of the network system 10. In the network system 10 illustrated in FIG. 11, all of the switch devices (switch devices #1 and #2) of the router #1 set the transfer mode to the repeater mode. On the other hand, all of the switch devices (switch devices #1 and #2) of the router #2 set the transfer mode to the switch mode. Also, with the above configuration, the same advantages as those in the configuration illustrated in FIG. 1 can be obtained.

Further, the configuration illustrated in FIG. 11 is particularly effective for the purpose of providing a redundant configuration element of the network system 10 to improve the reliability of the network system 10. Specifically, the data plane of the router #1 in which all of the switch devices are set in the repeater mode is the standby system, the data plane of the router #2 in which all of the switch devices are set in the switch mode is the operational system, and the traffics from the external are concentrated on the router #2 side. With this configuration, as illustrated in FIG. 11, the transfer processing can be conducted on only the router #2 in which the switch device operates in the switch mode in a normal state, and the high efficient transfer processing can be realized. Also, because the data plane of the router #1 which is the standby system operates in the repeater mode in which the power consumption is low, the power consumption as the overall network system 10 can be reduced. Further, when a failure occurs in the router #2, the data plane of the router #1 is changed to the operational system by the processing described in FIG. 10, and the processing can continue.

In the configuration illustrated in FIG. 11, the processing performance in the respective processing units of the data plane which is the standby system (router #1) may be decreased (for example, the CPU clock is decreased, etc.) to further reduce the power consumption. Also, a configuration in which the external port of the router #1 which is the standby system, and the external port of the router #2 which is the operational system are dealt with as one logical port with the use of the link aggregation function is also extremely effective as redundant means. The link aggregation function means a function which enables bundling a plurality of external ports (network interfaces 110), and dealing with the bundled external ports as one logical external port.

Figure 12:
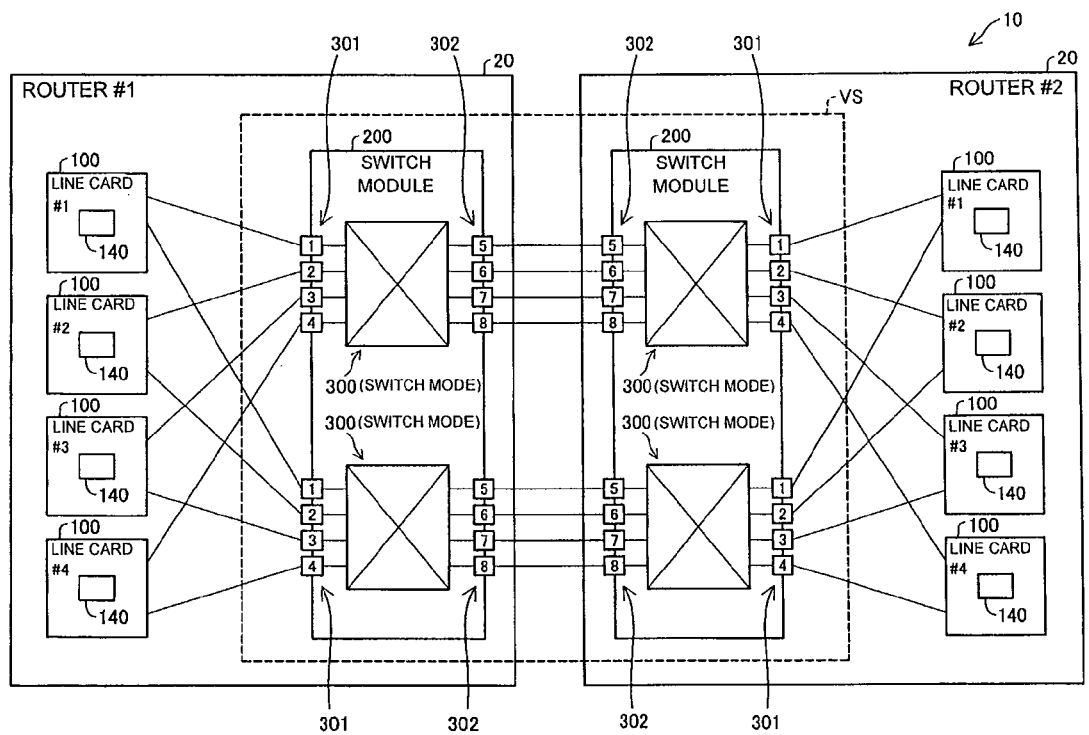
FIG. 12 is an illustrative view illustrating an example of another configuration of the network system.

FIG. 12 is an illustrative view illustrating an example of another configuration of the network system 10. In the network system 10 illustrated in FIG. 12, all of the switch devices (switch devices #1 and #2) of the router #1 and the router #2 set the transfer mode to the switch mode. In other words, both of the switch devices connected to each other by the external signal lines are the switch mode. Also, with this configuration, the same advantages as those in the configuration illustrated in FIG. 1 can be obtained.

Further, the configuration illustrated in FIG. 12 can maximize the transfer performance of the network system 10 since all of the switch devices operate in the switch mode, and is effective particularly for the purpose of mainly enhancing the performance of the network system 10.

3-B. Second Example of Non-Blocking

In a second example of non-blocking, a configuration in which a single transfer unit (switch device) is provided will be described. Hereinafter, a description will be given of only a portion having a configuration and operation different from those in the first example of non-blocking. In the figure, the same configuration portions as those in the first example are denoted by identical symbols in the first example described above, and the detailed description thereof will be omitted.

Figure 13:
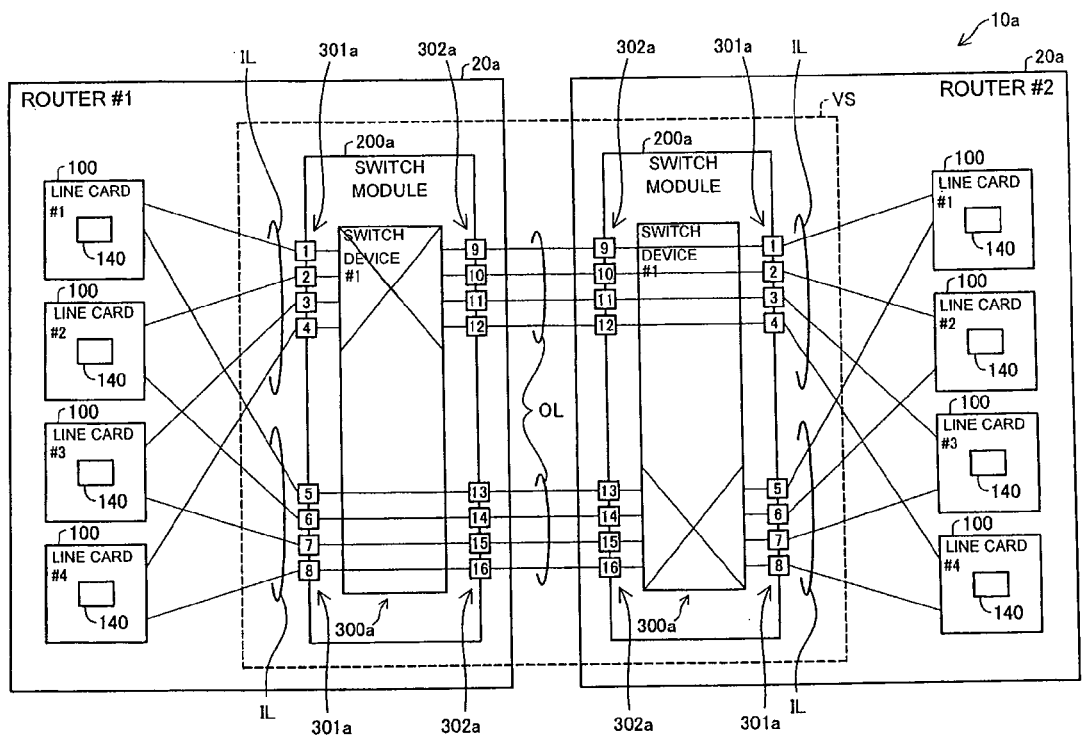
FIG. 13 is an illustrative view illustrating a schematic configuration of a network system according to a second example for non-blocking.

FIG. 13 is an illustrative view illustrating a schematic configuration of a network system 10a according to the second example for non-blocking. A difference from the first example illustrated in FIG. 1 resides in that the communication devices 1000 include a data plane 20a instead of the data plane 20. The data plane 20a includes a switch module 200a instead of the switch module 200.

Figure 14:
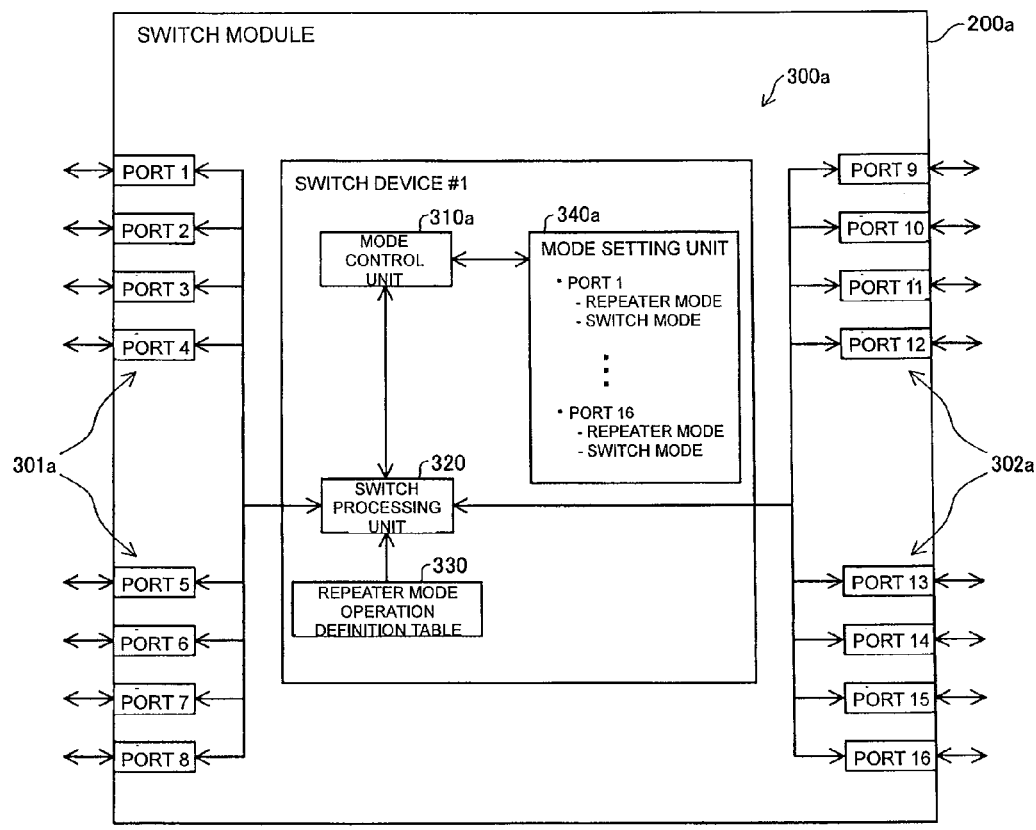
FIG. 14 is an illustrative view illustrating a schematic configuration of a switch module according to the second example for non-blocking.

FIG. 14 is an illustrative view illustrating a schematic configuration of the switch module 200a according to the second example for non-blocking. The switch module 200a in this example includes a single switch device 300a. Differences from the first example illustrated in FIG. 5 reside in that there are provided a port 301a instead of the port 301, a port 302a instead of the port 302, a mode control unit 310a instead of the mode control unit 310, and a mode setting unit 340a instead of the mode setting unit 340, respectively. The other configuration and operation are identical with those in the first example.

The port 301a is a generic name of the connection interface identified by the ports #1 to #8. The port 302a is a generic name of the connection interface identified by the ports #9 to #16. The mode control unit 310a has a function of switching the transfer mode (repeater mode/switch mode) of the switch device 300a according to the setting contents of the mode setting unit 340a. The mode setting unit 340a is a storage unit that stores respective setting values for determining the transfer mode of the switch device for the port 301a and the port 302a of the switch device 300a.

As described above, according to the second example of non-blocking, the mode control unit 310a controls the switch processing unit 320 so that the mode control unit 310a transfers the received packet with the use of the transfer mode determined for the port 301a and the port 302a. For that reason, even in the configuration where the communication device (router 20a) has only the single transfer unit (switch device 300a), the same advantages as those in the first example can be obtained.

3-C. Third Example of Non-Blocking

In a third example of non-blocking, a configuration in which the communication device (router) includes a plurality of switch modules will be described. Hereinafter, a description will be given of only a portion having a configuration and operation different from those in the first example of blocking. In the figure, the same configuration portions as those in the first example are denoted by identical symbols in the first example described above, and the detailed description thereof will be omitted.

Figure 15:
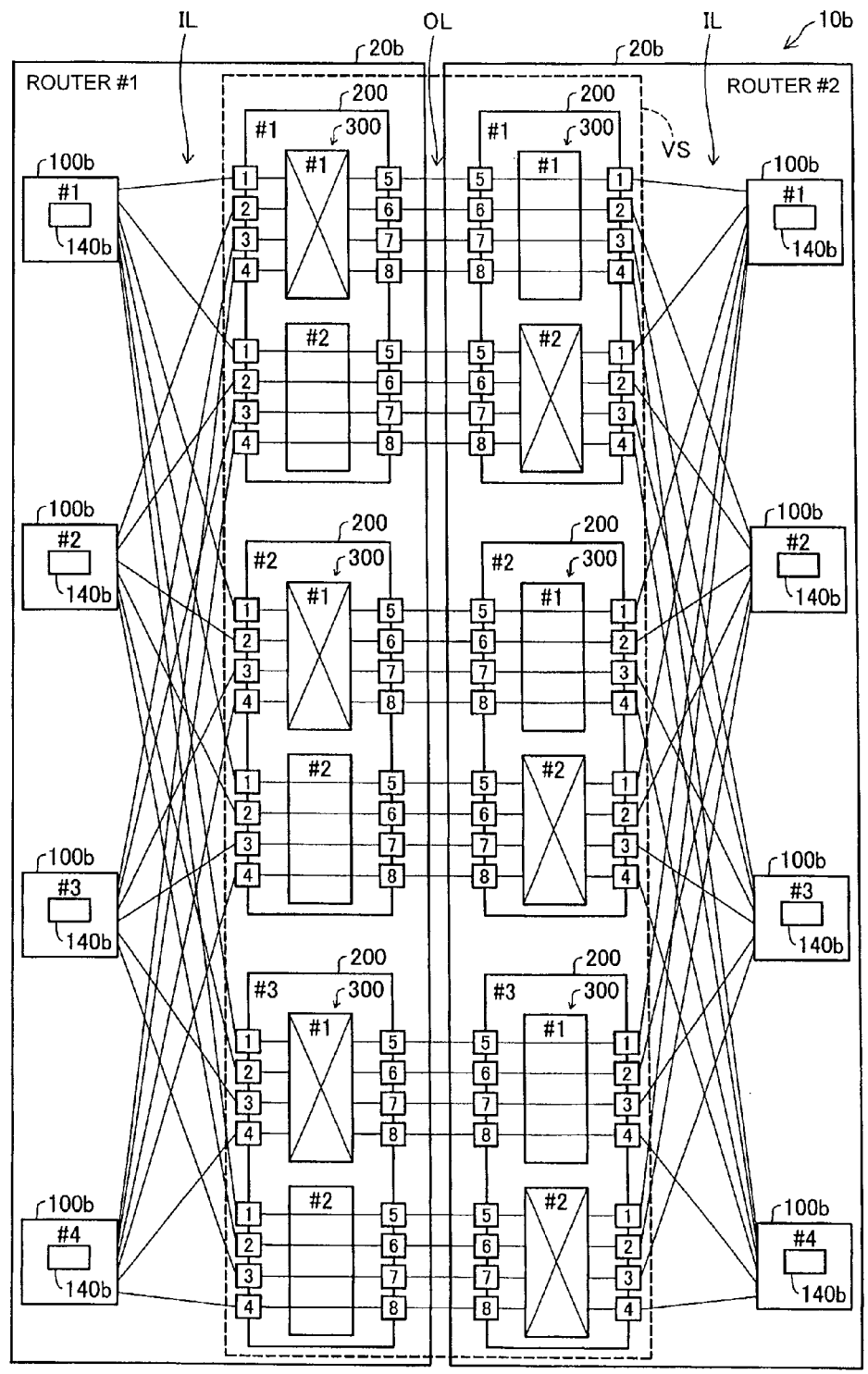
FIG. 15 is an illustrative view illustrating a schematic configuration of a network system according to a third example for non-blocking.

FIG. 15 is an illustrative view illustrating a schematic configuration of a network system 10b according to the third example for non-blocking. A difference from the first example illustrated in FIG. 1 resides in that a data plane 20b is provided instead of the data plane 20. The data plane 20b includes line cards 100b instead of the line cards 100, and further includes three switch modules 200.

The line cards 100b are connected to the ports 301 of six switch devices 300 included in the three switch modules 200 through the internal signal lines IL, respectively. For example, 24 (6×4) internal signal lines IL provided in the router #1 have a total bandwidth which is equal to or larger than a total of the bandwidths of lines in the line cards #1 to #4. Also, the ports 302 of the switch devices 300 are connected to the ports 302 of the other router by the external signal lines OL. 24 external signal lines OL that connect the routers #1 and #2 together have a total bandwidth which is equal to or larger than a total of the bandwidths of lines in the line cards #1 to #4.

The line cards 100b each include a load distribution processing unit 140b instead of the load distribution processing unit 140. As with the load distribution processing unit 140, the load distribution processing unit 140b conducts the load distribution processing when the router 20b receives the packets from the external. The load distribution processing conducted by the load distribution processing unit 140b is identical with the load distribution processing described with reference to FIG. 3 except that the processing in Step S112 is different therefrom.

In Step S112 of FIG. 3, the load distribution processing unit 140b outputs the processing packet through the transfer processing unit 150. In this situation, when there are plurality of routes for the plurality of switch devices 300, the load distribution processing unit 140b distributes the processing packet to a part of the routes for the switch devices 300. For example, when the load distribution processing unit 140b receives a plurality of packets having the same destination, and six routes for the destination are provided, the load distribution processing unit 140b can sequentially output the packets to parts (for example, four) of the six routes.

In the example of FIG. 15, an example in which a plurality of packets whose destination is the line card #4 of the router #1 are received, from the line card #1 of the router #1 will be described. There are the following six routes toward the line card #4 of the router #1.

Route 1) A route passing through the switch device #1 of the switch module #1

Route 2) A route passing through the switch device #2 of the switch module #1

Route 3) A route passing through the switch device #1 of the switch module #2

Route 4) A route passing through the switch device #2 of the switch module #2

Route 5) A route passing through the switch device #1 of the switch module #3

Route 6) A route passing through the switch device #2 of the switch module #3

The load distribution processing unit 140b sequentially outputs the processing packets, for example, to the above routes 1 to 4 in Step S112 of the load distribution processing (FIG. 3).

With the above configuration, the load distribution processing unit 140b can put the switch devices 300 (in the above example, the switch devices #1 and #2 of the switch module #3) to which the received packets are not distributed, into a standby state (sleep state) in which the power consumption is low. When the switch devices 300 of the sleep state are put into a backup system (standby system), even if, for example, the other switch devices 300 fail, the switch devices 300 which are in the sleep state are put into an active state, thereby being capable of continuing the processing of the router 20b. Thus, according to the third example, the switch devices 300 are made redundant within the communication device (router 20b), thereby being capable of further improving the reliability of the router 20b.

3-D. Fourth Example of Non-Blocking

In a fourth example of non-blocking, a description will be given of an example in which the network system is configured by three or more communication devices (routers). For example, this configuration corresponds to the data plane in the above-mentioned second embodiment. Hereinafter, a description will be given of only a portion having a configuration and operation different from those in the first example. In the figure, the same configuration portions as those in the first example are denoted by identical symbols in the first example described above, and the detailed description thereof will be omitted.

Figure 16:
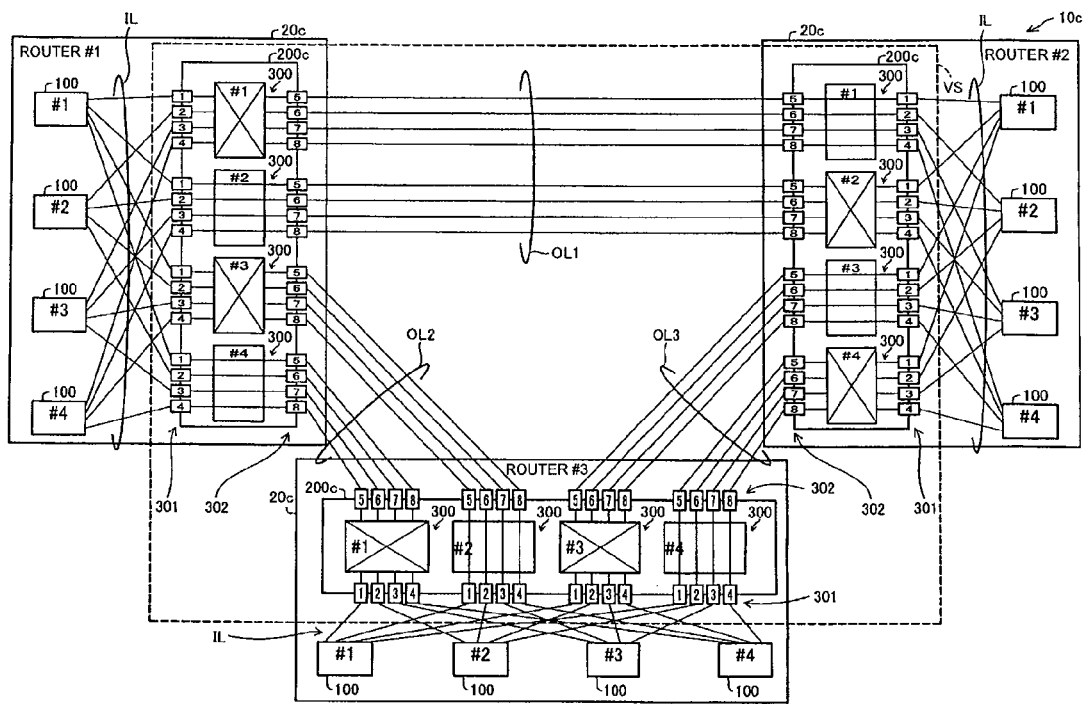
FIG. 16 is an illustrative view illustrating a schematic configuration of a network system according to a fourth example for non-blocking.

FIG. 16 is an illustrative view illustrating a schematic configuration of a network system 10c according to the fourth example for non-blocking. A difference from the first example resides in that three communication devices are provided. Data planes 20c of the respective communication devices each include a switch module 200c instead of the switch module 200. In this example, the switch module 200c includes four switch devices 300c.

The line cards 100 are connected to the respective ports 301 of the four switch devices 300 by the internal signal lines IL. For example, 16 (4×4) internal signal lines IL provided in the router #1 have a total bandwidth which is equal to or larger than a total of the bandwidths of lines in the line cards #1 to #4.

Also, the ports 302 of the switch devices 300 are connected to the ports 302 of the other router by the external signal lines. In the example of FIG. 16, the switch devices #1 and #2 of the router #1, and the switch devices #1 and #2 of the router #2 are connected to each other by external signal lines OL1. Likewise, the switch devices #3 and #4 of the router #1, and the switch devices #1 and #2 of the router #3 are connected to each other by external signal lines OL2. The switch devices #3 and #4 of the router #2, and the switch devices #3 and #4 of the router #3 are connected to each other by external signal lines OL3. The 16 external signal lines OL1 and OL2 that connect the router #1 and the other routers (routers #2 and #3) together have a total bandwidth which is equal to or larger than a total of the bandwidths of lines in the line cards #1 to #4. Likewise, the 16 external signal lines OL1 and OL3 that connect the router #2 and the other routers (routers #1 and #3) together, and the 16 external signal lines OL2 and OL3 that connect the router #3 and the other routers (routers #1 and #2) together, each have a total bandwidth which is equal to or larger than a total of the bandwidths of the lines in the line cards #1 to #4.

In the example of FIG. 16, for example, the plurality of packets whose destinations are the line card #4 of the router #1, which have been received from the line card #1 of the router #1, are distributed to the switch devices #1 to #4 of the router #1 by the load distribution processing (FIG. 3). The packets distributed to the switch device #1 of the router #1 are subjected to the switch mode transfer processing by the switch device, and output to a destination corresponding to the route search result. The packets distributed to the switch device #2 of the router #1 are transferred to the router #2, subjected to the switch mode transfer processing by the switch device #2 of the router #2, and output to the destination corresponding to the route search result. The packets distributed to the switch device #3 of the router #1 are subjected to the switch mode transfer processing by the switch device, and output to the destination corresponding to the route search result. The packets distributed to the switch device #4 of the router #1 are transferred to the router #3, subjected to the switch mode transfer processing by the switch device #1 of the router #3, and output to the destination corresponding to the route search result.

Thus, according to the fourth example of non-blocking, even if the network system is configured by two or more communication devices (routers), the same advantages as those in the first example can be obtained.

3-E. Fifth Example of Non-Blocking

In a fifth example of non-blocking, an example in which the number of internal signal lines and the number of external signal lines are different from each other will be described. Hereinafter, a description will be given of only a portion having a configuration and operation different from those in the first example. In the figure, the same configuration portions as those in the first example are denoted by identical symbols in the first example described above, and the detailed description thereof will be omitted.

Figure 17:
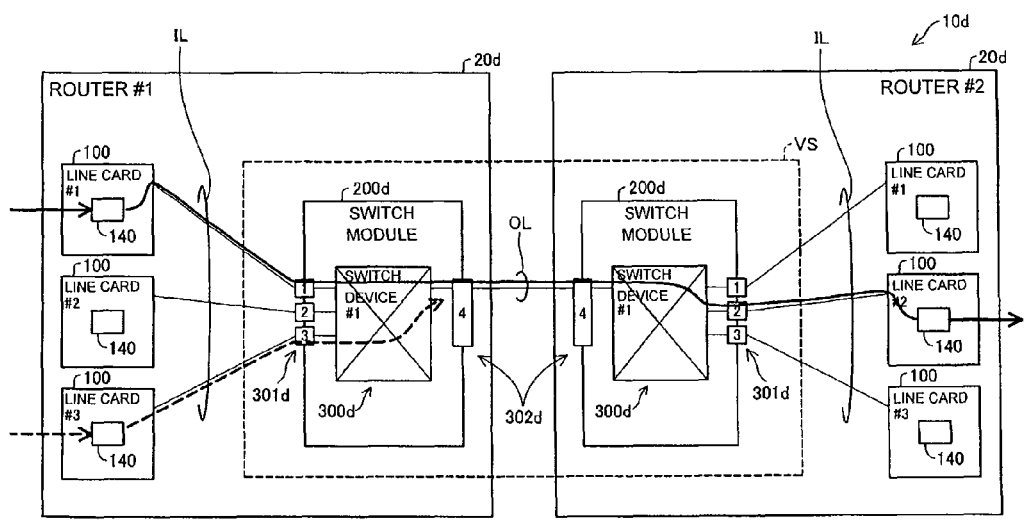
FIG. 17 is an illustrative view illustrating a schematic configuration of a network system according to a fifth example for non-blocking.

FIG. 17 is an illustrative view illustrating a schematic configuration of a network system 10d according to the fifth example for non-blocking. A difference from the first example illustrated in FIG. 1 resides in that the data plane 20 is replaced with a data plane 20d. The data plane 20d is different from the data plane 20 of the first example in that three line cards 100 are provided, and the switch module 200 is replaced with a switch module 200d. The switch module 200d includes one switch device 300d. The switch device 300d includes a port 301d, a port 302d, and the respective units illustrated in FIG. 5.

The port 301d is a generic name of the connection interface identified by the ports #1 to #3. The port 302d as the second external interface is a connection interface identified by the port #4. The three line cards 100 are respectively connected to the ports 301d of the switch devices 300 by the internal signal lines IL. The total bandwidth of the three internal signal lines IL can be arbitrarily determined, but preferably has the total bandwidth which is equal to or larger than a total of the bandwidths of the lines in the three line cards 100. The port 302d of the switch device 300d is connected to the port 302d of the other communication device (router) by one external signal line OL. It is preferable that the external signal lines OL according to this example have a total bandwidth which is equal to or larger than the bandwidths of the lines in the three line cards 100, like the internal signal line. In this example, the numbers (the numbers of links) of internal signal lines and external signal lines are different from each other.

In the example of FIG. 17, for example, the plurality of packets received from the line card #1 of the router #1, whose destinations are the line card #2 of the router #2 are all output to the switch device #1 of the router #1 by the load distribution processing (FIG. 3). The packets output to the switch device #1 of the router #1 are subjected to the switch mode transfer processing by the switch device, and output to a destination corresponding to the route search result. In the example of FIG. 17, the transfer mode of all the switch devices 300d is the switch mode. Alternatively, any one of the switch device #1 of the router #1, and the switch device #1 of the router #2 may be the repeater mode.

As described above, also in the fifth example of non-blocking, the switch device #1 of the router #1 and the switch device #2 of the router #2 cooperate with each other, and can transfer the received packet to the line cards #1 to #3 of the router #1 or the router #2 as the imaginary one virtual transfer unit VS. As a result, there can be provided the communication device (router) that can construct the virtual network relay device (high reliability virtualization device) that can use all of the external ports (network interfaces 110), without need of an additional device. Also, the configuration of this example has, as in the first example, the effect of reducing the power consumption of the virtual transfer unit VS and the redundant effect of the network system.

On the other hand, in the fifth example, when the traffic (dashed arrow in FIG. 17) is input from the different line cards during the switch mode transfer processing in the switch device 300, and the external signal lines OL have a total bandwidth smaller than that of the internal signal lines IL, there is a risk that blocking is generated in the external signal lines OL that connect the routers. However, in the configuration of the fifth example, because the number of external signal lines OL that connect the router 20d may be one, the virtual network relay device (high reliability virtualization device) can be constructed at lower costs.

3-F. Sixth Example of Non-Blocking

In a sixth example of non-blocking, an example in which the number of internal signal lines and the number of external signal lines are different from each other will be described. Hereinafter, a description will be given of only a portion having a configuration and operation different from those in the first example. In the figure, the same configuration portions as those in the first example are denoted by identical symbols in the first example described above, and the detailed description thereof will be omitted.

Figure 18:
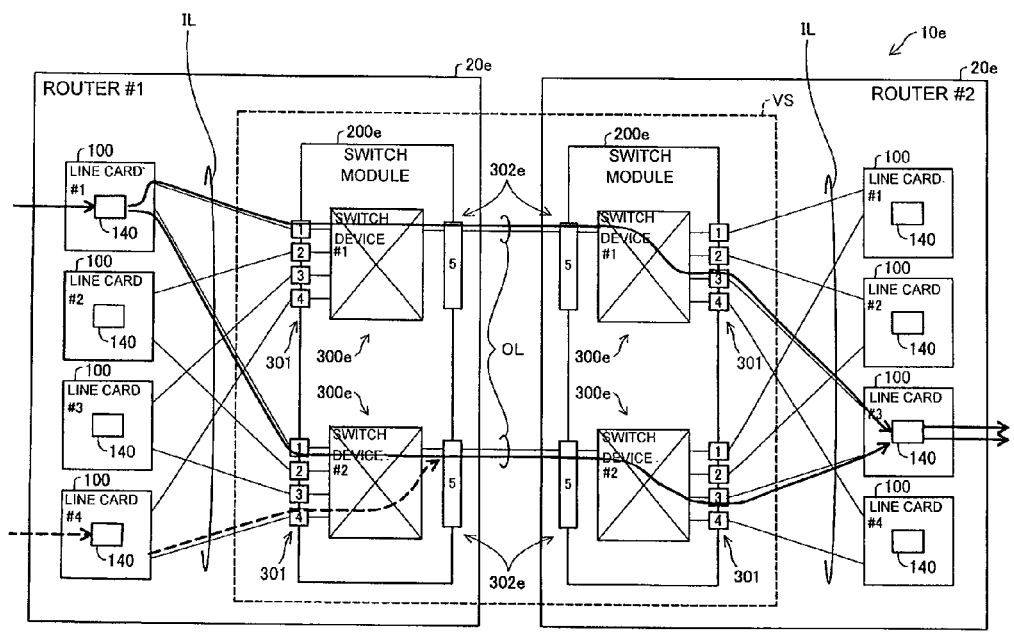
FIG. 18 is an illustrative view illustrating a schematic configuration of a network system according to a sixth example for non-blocking.
Figure 19:
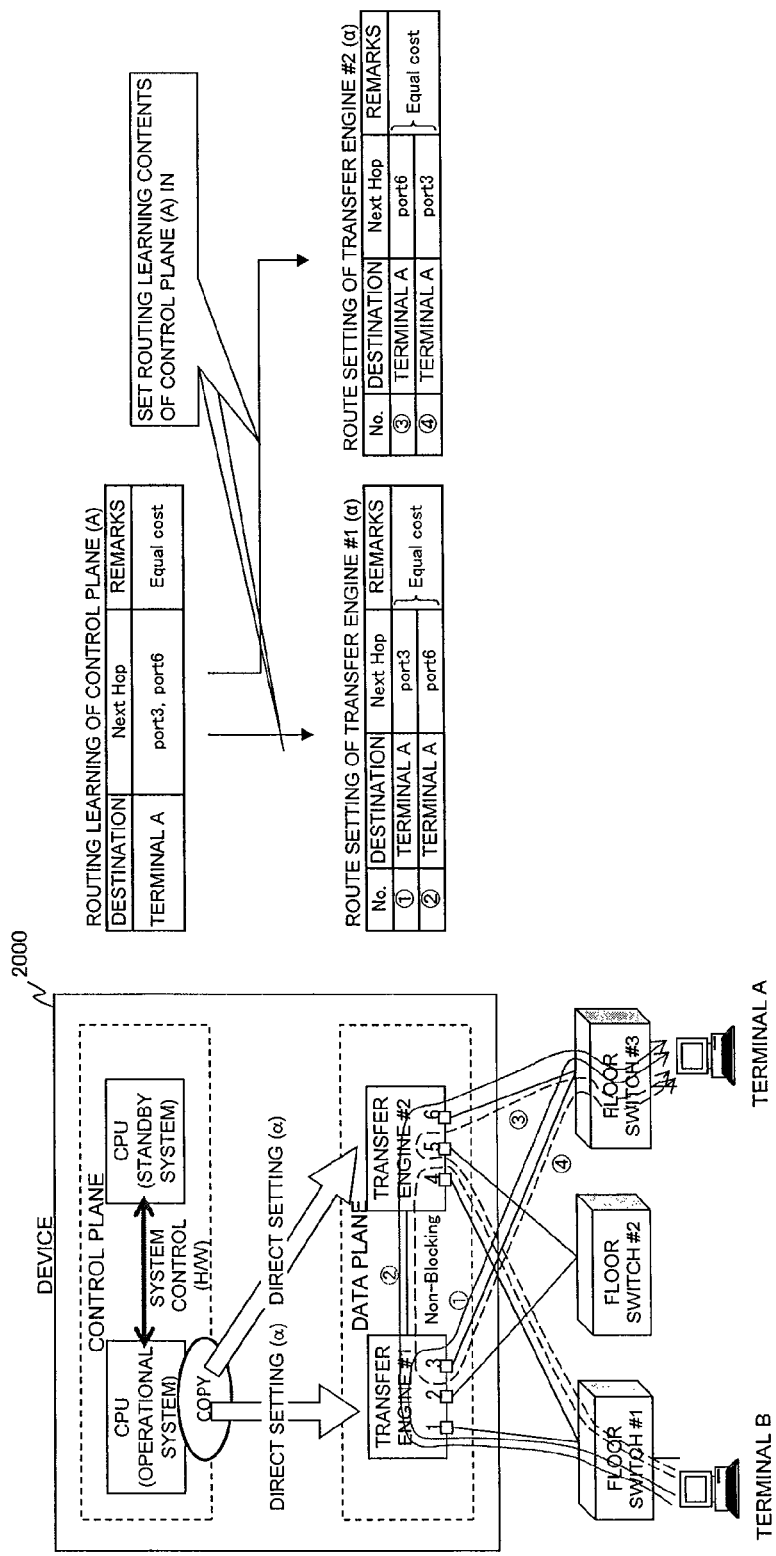
FIG. 19 is an illustrative view of a single-chassis.
Figure 20:
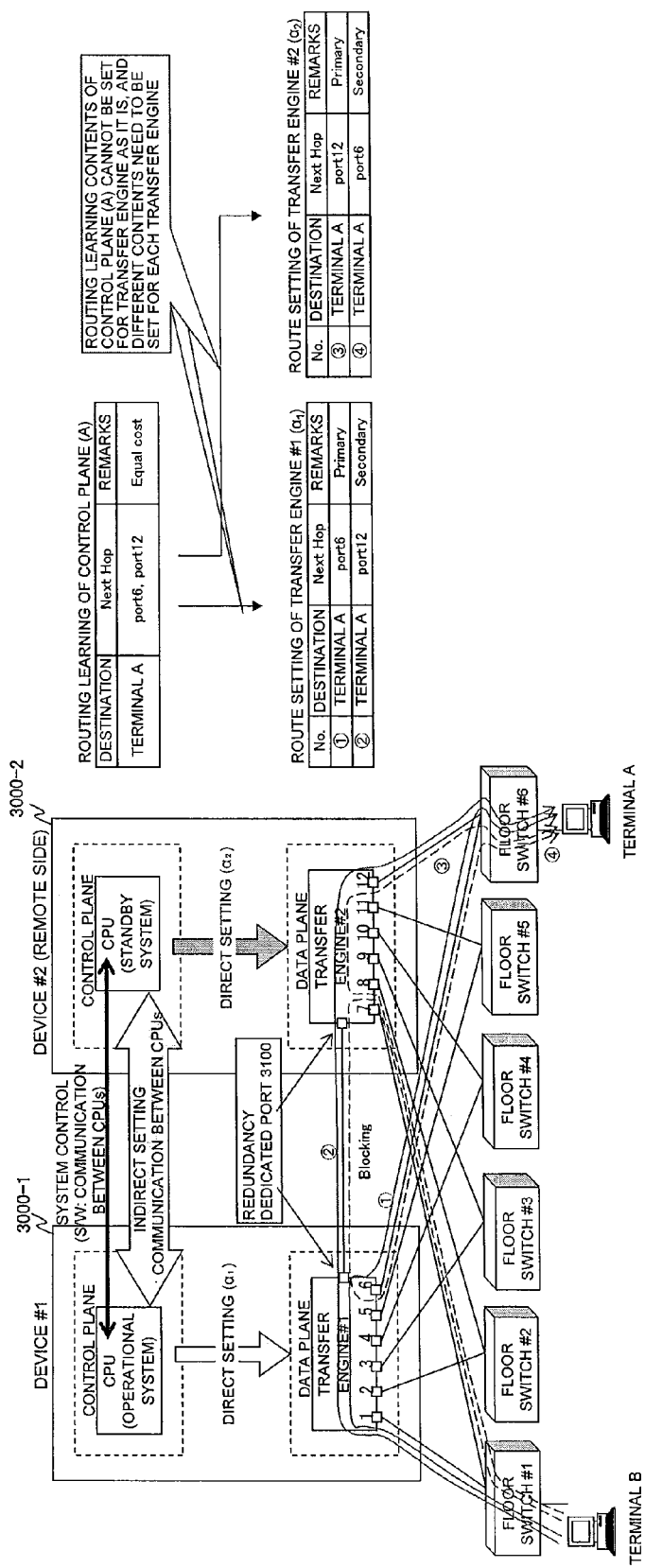
FIG. 20 is an illustrative view of a multi-chassis.

FIG. 18 is an illustrative view illustrating a schematic configuration of a network system 10e according to the sixth example for non-blocking. A difference from the first example illustrated in FIG. 1 resides in that the data plane 20 is replaced with a data plane 20e. The data plane 20e is different from the data plane 20 in that the switch module 200 is replaced with a switch module 200e. The switch module 200e includes two switch devices 300e. The switch device 300e includes a port 301, a port 302e, and the respective units illustrated in FIG. 5.

A port 302e as the second external interface is a connection interface identified by the port #5. The port 302e is connected to the port 302e of the other communication device (router) by one external signal line OL. It is preferable that the external signal lines OL according to this example have a total bandwidth which is equal to or larger than the bandwidths of the lines in the three line cards 100, as with the internal signal lines. In this example, the numbers (the numbers of links) of internal signal lines and external signal lines are different from each other.

In the example of FIG. 18, for example, the plurality of packets received from the line card #1 of the router #1, whose destinations are the line card #3 of the router #2 are distributed to the switch device #1 of the router #1 and the switch device #2 of the router #1 by the load distribution processing (FIG. 3). The distributed packets are subjected to the switch mode transfer processing by each of the switch devices, and output to a destination corresponding to the route search result. In the example of FIG. 18, the transfer mode of all the switch devices 300e is the switch mode. Alternatively, any one pair of the switch device #1 of the router #1 and the switch device #2 of the router #2, and, the switch device #2 of the router #1 and the switch device #1 of the router #2 may be the repeater mode.

As described above, also in the sixth example of non-blocking, the switch device #1 and #2 of the router #1 and the switch device #1 and #2 of the router #2 cooperate with each other, and can transfer the received packet to the line cards #1 to #4 of the router #1 or the router #2 as the imaginary one virtual transfer unit VS. As a result, there can be provided the communication device (router) that can construct the virtual network relay device (high reliability virtualization device) that can use all of the external ports (network interfaces 110), without need of an additional device. Also, the configuration of this example has, as in the first example, the effect of reducing the power consumption of the virtual transfer unit VS and the redundant effect of the network system.

On the other hand, in the sixth example, when the traffic (dashed arrow in FIG. 17) is input from the different line cards during the switch mode transfer processing in the switch device 300, and the external signal lines OL have a total bandwidth smaller than that of the internal signal lines IL, there is a risk that blocking is generated in the external signal lines OL that connect the routers. However, in the configuration of the sixth example, because the number of external signal lines OL that connect the router may be one, the virtual network relay device (network system 10e) can be constructed at lower costs.

3-G. Modified Example

The present invention is not limited to the above examples and embodiments, but can employ a variety of configurations without departing from the spirit of the present invention. For example, the function realized by software may be realized by hardware.

In addition, the following modifications can be conducted.

3-G1. Modified Example 1

The above examples and embodiments exemplify the configurations of the network system. However, the configuration of the network system is not limited to the above-mentioned modes, but can be arbitrarily determined without departing from the spirit of the present invention.

For example, the number of routers (communication devices, network relay devices) configuring the network system (network relay system) can be arbitrarily changed. Also, as the communication device configuring the network system, the device (for example, layer 3 switch, etc.) other than the router may be used.

For example, the numbers and the total bandwidths of the internal signal lines that connect the line cards and the switch devices, and the external signal lines that connect between the switch devices of the different routers may be different from each other. In the network system, in order to allow the non-blocking communication to be realized, as described above, it is preferable that the internal signal lines and the external signal lines have the total bandwidth which is equal to or larger than a total of the bandwidths of the lines in the line cards, and the external signal lines have the total bandwidth which is equal to or larger than the total bandwidth of the internal signal lines.

3-G2. Modified Example 2

The above examples and embodiments exemplify the configuration of the router as the communication device.

However, the configuration of the communication device is not limited to the above-mentioned modes, but can be arbitrarily determined without departing from the spirit of the present invention.

For example, the numbers of line cards and switch devices provided in the router are exemplary, and can be arbitrarily changed according to the performance demanded for the routers, and the processing performance of the line cards and the switch devices.

For example, in the above examples and embodiments, the destination determination unit and the routing table included in the line card may be included in the switch module. Also, a line card only for transfer processing may be additionally provided, and the destination determination unit and the routing table may be included in the line card only for transfer processing.

3-G3. Modified Example 3

In the above examples and embodiments, an example of the load distribution processing executed by the load distribution processing unit is described with the example of the processing procedure. However, the procedures of the above examples and embodiments are exemplary, and a variety of modifications can be conducted.

For example, when there are the plurality of routes for the line card to which the processing packets are to be output, the load distribution processing unit sequentially outputs the packets to the plurality of routes (Step S112 in FIG. 3). However, the load distribution processing unit refers to the destination of the processing packets, and can execute a control to transmit the packets to the switch device set in the switch mode if the destination line card is the line card which is present in the subject router (in other words, if the output destination of the processing packet determined according to the destination of the processing packet belongs to the network interface within the subject router). Also, the load distribution processing unit also transmits the packets to the switch device set in the repeater mode if the destination line card is the line card which is present in the other router (in other words, if the output destination of the processing packet determined according to the destination of the processing packet is the other router). With the above configuration, because the switch mode transfer processing is conducted in the router having the destination line card, the data transfer high in efficiency can be conducted.

3-G4. Modified Example 4

In the above examples and embodiments, an example in which the mode control unit (mode change unit) switches the transfer mode of the switch device to the other is described. However, the mode change unit can change the transfer mode of the switch device under an arbitrary condition.

For example, the mode change unit refers to the destination of the processing packet, and can change the transfer mode of the switch device that outputs the processing packet to the switch device when the destination line card is the line card present in the subject router (in other words, the output destination of the processing packet determined according to the destination of the processing packet belongs to the network interface within the subject router). Also, the mode change unit can change the transfer mode of the switch device that outputs the processing packet to the repeater mode when the destination line card is the line card present in the other router (in other words, the output destination determined according to the destination of the processing packet is the other router). With the above configuration, because the switch mode transfer processing is conducted in the router having the destination line card, the data transfer high in efficiency can be conducted.

3-G5. Modified Example 5

In the above examples and embodiments, the respective tables provided in the routers have been described. However, the above examples and the embodiments are exemplary, and a variety of modifications can be added. For example, items of fields provided in the tables can be added, deleted, or changed. Also, the respective tables can employ a direct map system.

3-G6. Modified Example 6

In the above first to sixth examples for non-blocking, the examples of the configurations of the network system have been exemplified. However, the configuration of the network system is not limited to the above-mentioned modes, but can be arbitrarily determined without departing from the spirit of the present invention. For example, a network system in which the configuration having the single switch device within the switch module (second example) and the configuration having the plurality of switch modules (third example) are combined together can be realized. Likewise, the other examples can be arbitrarily combined together.

INDUSTRIAL APPLICABILITY

The present invention is available for a network relay device such as a router or a switch.

REFERENCE SIGNS LIST

20 data plane
160 routing table
1000 communication device (network relay device)
1100 control plane
1110 CPU (processing unit)
1120 control system repeater

The invention claimed is:

1. A network relay system including a plurality of communication devices, each of the communication devices comprising:
   a transfer processing unit that transfers an input packet according to routing information; and
   a control unit having a processing unit that learns the routing information, and a control system repeater that is connected for directly setting the routing information between the plurality of communication devices, wherein one of the control units of one of the communication devices is set in an operational system and another control unit of another one of the communication devices is set in a standby system, wherein
   the control system repeater of the control unit in the operational system receives the routing information from the processing unit, sets the routing information for the transfer processing unit of the communication device, copies the routing information, and transmits the routing information directly to the control system repeater of the other communication device, and
   the control system repeater of the control unit in the standby system receives the routing information from the control system repeater of the communication device, and sets the routing information for the transfer processing unit of the communication device.

2. The network relay system according to claim 1, wherein
the transfer processing unit includes:
a connection unit including an external interface which is a connection interface for connecting with an external device; and
a transfer unit that transfers a received packet received through the connection unit, and
the respective transfer processing units of the plurality of communication devices are connected by an external signal line having a total bandwidth which is equal to or larger than a total of bandwidths of lines in the connection unit of a predetermined communication device to make the non-blocking communication with each other realizable.

3. The network relay system according to claim 2, wherein
a relay route from a first device to a second device is made redundant by a route passing through any one of the transfer processing units of the communication devices, and a route passing through the transfer processing unit of the plurality of communication devices and the external signal line.

4. The network relay system according to claim 1, wherein
the control unit of the respective communication devices implements a system control of the operational system and the standby system through the control system repeater being configured to detect a failure at least in part by hardware.

5. The network relay system according to claim 1, wherein
one of the control units of the plurality of communication devices is the operational system, and the control units of the other communication devices are the standby system, and
the transfer processing units of the plurality of communication devices are the operational systems.

6. The network relay system according to claim 1, wherein
two or more of the control units of the plurality of communication devices are the operational systems, and the control units of the other communication devices are the standby systems, and
the transfer processing units of the plurality of communication devices are the operational systems.

7. The network relay system according to claim 1, wherein
the respective control system repeaters of the plurality of communication devices are connected to each other by a ring configuration, and
when the control system repeater of the communication device of the standby system receives the routing information from the control system repeater of the other communication device, the control system repeater sets the routing information for the transfer processing unit of the communication device of the standby system, copies the routing information, and transmits the routing information to the control system repeater of the other communication device.

8. The network relay system according to claim 1, wherein the respective control system repeaters of the plurality of communication devices are connected to each other by a full mesh configuration.

9. A communication device in a network relay system including the plurality of communication devices, each of the communication devices comprising:
a transfer processing unit that transfers an input packet according to routing information; and
a control unit having a processing unit that learns the routing information, and a control system repeater that is connected for directly setting the routing information between the plurality of communication devices, wherein one of the control units of one of the communication devices is set in an operational system and another one of the control units of another one of the communication devices is set in a standby system, wherein
the transfer processing unit and a transfer processing unit of the other communication device can realize a non-blocking communication with each other,
the control system repeater of the control unit, when the control system repeater of the control unit is set in the operational system, receives the routing information from the processing unit, sets the routing information for the transfer processing unit of the communication device, copies the routing information, and transmits the routing information directly to the control system repeater of the other communication device, and
the control system repeater of the control unit, when the control system repeater of the control unit is set in the standby system, receives the routing information from the control system repeater of the other communication device, and sets the routing information for the transfer processing unit of the communication device.

10. The communication device according to claim 9, wherein the transfer processing unit includes:
a connection unit having a first external interface which is a connection interface for connecting with an external device;
an internal signal line having a total bandwidth which is equal to or larger than a total of bandwidths of lines in the connection unit; and
a transfer unit connected to the connection unit by the internal signal line to transfer a received packet received through the connection unit, wherein the transfer unit includes a second external interface for connection to the other communication device.

11. The communication device according to claim 10, wherein the transfer unit includes:
a first transfer mode for outputting the received packet from the second external interface associated with the first external interface that receives the received packet in advance; and
a second transfer mode for outputting the received packet from the first external interface or the second external interface which is determined from a destination of the received packet, and
the transfer unit further includes:
a mode control unit that switches between the first transfer mode and the second transfer mode.

12. The communication device according to claim 10, further comprising: a plurality of the transfer units, wherein
each of the plurality of transfer units is connected to the connection unit by the internal signal line, and
the second external interface and the second external interface of the other network communication device can be connected to each other by the external signal line.

13. The communication device according to claim 12, wherein the plurality of transfer units each include:
the transfer unit set in the first transfer mode; and
the transfer unit set in the second transfer mode.

14. The communication device according to claim 10, wherein the connection unit further includes:
a load distribution processing unit that distributes the received packet to a plurality of routes when there is the plurality of routes from the connection unit to the transfer unit.

15. The communication device according to claim 14, wherein the load distribution processing unit approximately equalizes the distribution of the received packet to the plurality of routes.

16. The communication device according to claim 12, wherein
the connection unit further includes:
a load distribution processing unit that distributes the received packet to a plurality of routes when there is the plurality of routes from the connection unit to the transfer units, and
the load distribution processing unit distributes the received packet to the routes of a part of the transfer units.

17. The communication device according to claim 12, wherein
the connection unit further includes:
a load distribution processing unit that distributes the received packet to a plurality of routes when there is the plurality of routes from the connection unit to the transfer units, and
the load distribution processing unit
distributes the received packet to the route for the transfer unit set in the second transfer mode when an output destination of the received packet determined according to a destination of the received packet belongs to the first external interface, and
distributes the received packet to the route for the transfer unit set in the first transfer mode when the output destination of the received packet determined according to the destination of the received packet belongs to the other communication device.

18. The communication device according to claim 11, wherein the control system repeater includes hardware configured at least in part to detect a failure in the other communication device, the communication device further comprising:
a mode change unit that changes the transfer unit set in the first transfer mode to the second transfer mode if the failure in the other communication device is detected.

19. The network relay system according to claim 1, wherein the transfer processing unit includes:
a connection unit having a first external interface which is a connection interface for connecting with an external device;
an internal signal line having a total bandwidth which is equal to or larger than a total of bandwidths of lines in the connection unit; and
a transfer unit connected to the connection unit by the internal signal line, transfers the received packet received through the connection unit, and having a second external interface which is connected to the other communication device, and
the second external interface of the communication device and the second external interface of the other communication device are connected to each other by an external signal line.

20. The network relay system according to claim 19, wherein
each of the transfer units of the communication device includes:
a first transfer mode for outputting the received packet from the second external interface associated with the first external interface that receives the received packet in advance; and
a second transfer mode for outputting the received packet from the first external interface or the second external interface which is determined from a destination of the received packet, and
each of the transfer units of the communication device includes:
a mode control unit that switches between the first transfer mode and the second transfer mode.

21. The network relay system according to claim 19, wherein
each of the communication devices includes a plurality of the transfer units,
each of the plurality of transfer units is connected to the connection unit by the internal signal line, and
respective second external interfaces of the communication devices are connected to each other by the external signal line, the external signal line having a total bandwidth that is equal to or larger than any larger value of a total of the bandwidths of lines in the connection unit of the communication device, and a total of the bandwidths of lines in the connection unit of the other communication device.

22. The network relay system according to claim 21, wherein each of the plurality of transfer units includes:
each transfer unit is settable in a first transfer mode; and
each transfer unit is settable in a second transfer mode,
wherein a first transfer unit to be set in the first transfer mode of a first communication device and a second transfer unit to be set in the second transfer mode of a second communication device are connected to each other by the external signal line, and
a third transfer unit to be set in the second transfer mode of the first communication device and a fourth transfer unit to be set in the first transfer mode of the second communication device are connected to each other by the external signal line.

23. The network relay system according to claim 21, wherein
all of the plurality of transfer units of a first communication device are set in a first transfer mode,
all of the plurality of transfer units of a second communication device are set in a second transfer mode, and
the transfer units set in the first transfer mode of the first communication device and the transfer units set in the second transfer mode of the second communication device are connected to each other by the external signal line.

24. The network relay system according to claim 21, wherein
the transfer units are settable in at least one of a first transfer mode or a second transfer mode,
all of the plurality of transfer units of a first communication device are set in the second transfer mode,
all of the plurality of transfer units of a second communication device are set in the second transfer mode, and
the transfer units set in the second transfer mode of the first communication device and the transfer units set in the second transfer mode of the second communication device are connected to each other by the external signal line.

\* \* \* \* \*